US 12,445,728 B2

(12) United States Patent
Toyoda

(10) Patent No.: US 12,445,728 B2
(45) Date of Patent: Oct. 14, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Takuya Toyoda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 18/495,849

(22) Filed: Oct. 27, 2023

(65) Prior Publication Data

US 2024/0163558 A1    May 16, 2024

(30) Foreign Application Priority Data

Nov. 15, 2022    (JP) .................... 2022-182284

(51) Int. Cl.
*H04N 23/69*    (2023.01)
*G06T 7/20*    (2017.01)
(Continued)

(52) U.S. Cl.
CPC .............. *H04N 23/69* (2023.01); *G06T 7/20* (2013.01); *G06V 10/25* (2022.01); *H04N 23/61* (2023.01); *G06V 2201/07* (2022.01)

(58) Field of Classification Search
CPC ...... H04N 23/69; H04N 23/61; H04N 23/611; G06T 7/20; G06V 10/25; G06V 2201/07; G06V 20/52

See application file for complete search history.

(56) References Cited

U.S. PATENT DOCUMENTS 8,885,069 B2 * 11/2014 Kunishige .............. H04N 23/69
348/240.99
9,253,410 B2    2/2016 Tsubusaki
(Continued)

FOREIGN PATENT DOCUMENTS

CN         104168449 A    11/2014
JP      2021-148646 A     9/2021

OTHER PUBLICATIONS

Extended European Search Report issued Apr. 10, 2024, in corresponding European Patent No. 23207372.6 (22 pages).

*Primary Examiner* — Shahbaz Nazrul
(74) *Attorney, Agent, or Firm* — Venable LLP

(57) ABSTRACT

An information processing apparatus including at least one processor or circuit to function as a detection unit to detect a predetermined target object from an image captured by an image capturing unit, a setting unit to set a predetermined region with respect to the image, a determination unit to determine whether the target object has exited the predetermined region, a control unit to control an image capturing range of the image capturing unit according to a determination result, and a zoom magnification setting unit to set zoom magnification of the image capturing unit to the same zoom magnification as that before the target object enters the predetermined region. When the target object has exited inside the predetermined region, the determination unit performs an exit determination based on whether the target object has exited from an exit determination region that is smaller than the predetermined region.

10 Claims, 23 Drawing Sheets

(51) Int. Cl.
*G06V 10/25* (2022.01)
*H04N 23/61* (2023.01)

(56) References Cited

U.S. PATENT DOCUMENTS

| | | |
|---|---|---|
| 9,665,260 B2 | 5/2017 | Lee et al. |
| 9,679,394 B2 | 6/2017 | Yoshizumi |
| 10,042,031 B2 | 8/2018 | Kumar et al. |
| 10,939,055 B2 | 3/2021 | Mikami |
| 12,149,822 B2 | 11/2024 | Suzuki |
| 2011/0001840 A1 | 1/2011 | Ishii et al. |
| 2012/0062769 A1 | 3/2012 | Kinoshita |
| 2012/0105647 A1 | 5/2012 | Yoshizumi |
| 2012/0113267 A1 | 5/2012 | Ishige |
| 2012/0200721 A1 | 8/2012 | Hara et al. |

\* cited by examiner

INFORMATION PROCESSING APPARATUS, INFORMATION PROCESSING METHOD, AND STORAGE MEDIUM

CROSS-REFERENCE TO PRIORITY APPLICATION

This application claims the benefit of Japanese Patent Application No. 2022-182284, filed on Nov. 15, 2022, which is hereby incorporated by reference herein in its entirety.

BACKGROUND OF THE INVENTION

Field of the Invention

The present invention relates to an information processing apparatus for tracking, an information processing method, a storage medium, and the like.

Description of the Related Art

There has been a growing demand for automatically capturing images of dynamic scenes such as lecture and sport scenes by using a remote camera in recent years. As a technique for implementing automatic image capturing, there is known a technique for adjusting an angle of view by performing pan/tilt/zoom (hereinafter referred to as "PTZ") operation based on the movement of a tracking target subject, so that the tracking target subject is kept within the angle of view.

In addition, for example, in a lecture use scenario, when a lecturer is explaining a board or slides, there are cases in which it is desirable to keep both the lecturer and the subject of the explanation within a screen. At that time, if the angle of view is controlled in accordance with the explanation movements or the movement of the standing position of the lecturer, the text on the board or slides behind the lecturer becomes difficult to see.

To prevent this, it is conceivable to fix the angle of view when the tracking target subject enters a specific region, and to control the angle of view in accordance with the composition setting (setting for where the target is to be displayed within the screen and how large the target is to be displayed within the screen) when the tracking target subject exits the region.

In contrast, in Japanese Patent Application Laid-Open No. 2021-148646, a configuration is disclosed in which an exit determination region of a different size from the error range is set according to the error range of the position of a terminal apparatus of a target subject, and an exit from the monitored region is determined based on the overlapping relationship between the monitored region and the exit determination region. However, the image capturing angle of view was not appropriately controlled at the time of exit.

An object of the present invention is to provide an information processing apparatus that can appropriately perform angle of view control of a target object when the target object exits a predetermined region.

SUMMARY OF THE INVENTION

An information processing apparatus according to an aspect of the present invention includes at least one processor or circuit configured to function as a detection unit configured to detect a predetermined target object from an image that has been captured by an image capturing unit, a setting unit configured to set a predetermined region with respect to the image, a determination unit configured to perform a determination as to whether or not the target object has exited from the inside of the predetermined region, a control unit configured to control an image capturing range of the image capturing unit according to a result that has been determined by the determination unit, and a zoom magnification setting unit configured to set the zoom magnification of the image capturing unit to the same zoom magnification as that before the target object enters the predetermined region, in a case in which the determination unit determines that the target object has exited from the inside of the predetermined region.

Further features of the present invention will become apparent from the following description of embodiments with reference to the attached drawings.

DESCRIPTION OF THE EMBODIMENTS

Hereafter, with reference to the accompanying drawings, favorable modes of the present invention will be described using Embodiments. In each diagram, the same reference signs are applied to the same members or elements, and a duplicate description will be omitted or simplified.

First Embodiment

Figure 1:
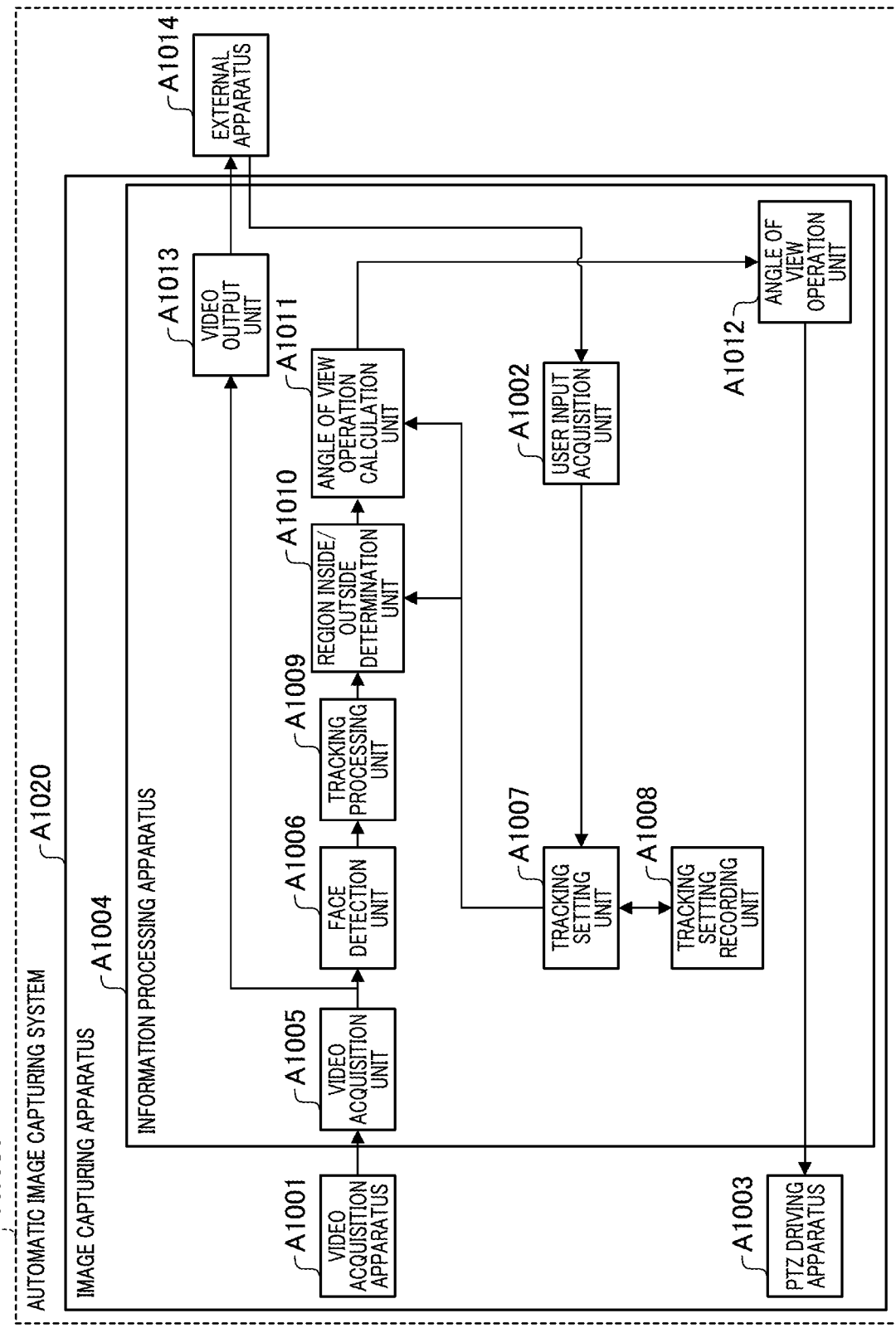
FIG. 1 is a functional block diagram of an automatic image capturing system according to a First Embodiment of the present invention.

An exemplary configuration of an automatic image capturing system A1000 according to a First Embodiment of the present invention will be explained with reference to FIG. 1. FIG. 1 is a functional block diagram of the automatic image capturing system according to the First Embodiment of the present invention.

It should be noted that some of the functional blocks illustrated in FIG. 1 are implemented by causing the CPU, or the like, serving as a computer (not shown) included in an automatic image capturing system to execute a computer program that has been stored in a memory serving as a storage medium (not shown).

However, a portion of or all of these may also be made so as to be realized by using hardware. An application-specific integrated circuit (ASIC), a processor (reconfigurable processor, DSP), or the like, can be used as the hardware.

In addition, each of the functional blocks that are shown in FIG. 1 do not need to be encased in the same body, and may also be configured by separate devices that have been connected to each other via a signal path. Note that the above explanation related to FIG. 1 also applies to FIG. 10, FIG. 15, and FIG. 19.

An automatic image capturing system A1000 according to the present embodiment includes an image capturing apparatus A1020 that comprises a video acquisition apparatus A1001, a PTZ driving apparatus A1003, and an information processing apparatus A1004, and also includes an external apparatus A1014.

The image capturing apparatus A1020 and the external apparatus A1014 are connected to each other via a network. In addition, the image capturing apparatus A1020 and the external apparatus A1014 may be connected via a video interface.

The image capturing apparatus A1020 of the present embodiment performs tracking processing of a predetermined target object based on a video acquired from the video acquisition apparatus A1001 and a tracking setting acquired from a user input acquisition unit A1002. Then, the image capturing apparatus A1020 performs angle of view control by using the PTZ driving apparatus A1003 so that the tracking target does not deviate from the angle of view.

It should be noted that, in the present embodiment, the predetermined target object for tracking is a human body, particularly, a human face. Thus, a human body or the face of a human body is automatically tracked. However, the predetermined target object for which tracking is performed is not limited to a human body and may be an animal. Alternatively, the target object may be a moving body such as an automobile, an airplane, a train, a ship, and the like, and the target in the present embodiment includes such animals and other moving bodies.

When angle of view control is performed, a determination is performed as to whether or not the tracking target is inside a predetermined region (a region that has been set), and the angle of view control is switched between when the tracking target is inside the predetermined region and when it is outside the predetermined region. Further, the image capture result is displayed on the external apparatus A1014. The external apparatus A1014 is, for example, a PC terminal that includes a display element such as a liquid crystal display.

The video acquisition apparatus A1001 is an apparatus configured to generate captured video by capturing images of the surroundings, and is configured by a camera, or the like, as an image capturing unit. The video acquisition apparatus A1001 outputs the video information that has been captured to a face detection unit A1006 and a video output unit A1013 of the information processing apparatus A1004.

The user input acquisition unit A1002 is a portion that acquires a tracking setting by the user. The user input acquisition unit A1002 acquires a setting from an external apparatus A1014 configured by a graphical user interface (GUI), or the like, operating on a web browser (not shown), or the like. The user input acquisition unit A1002 outputs the tracking setting that has been input by the user to a tracking setting unit A1007.

The user input acquisition unit A1002 functions as a setting unit for setting a predetermined region or composition of the image. Here, "composition" represents the position at which the tracking target subject is displayed within the screen and the size at which it is displayed. That is, the user input acquisition unit A1002 can set the composition of the target object in the image, such as the display position and display size thereof.

It should be noted that the setting unit is not limited to an example in which a user sets a predetermined region or composition with respect to an image, and may be configured to set a predetermined region or composition in accordance with the characteristics (shape, size, speed, acceleration) of a subject that has been detected by image recognition, or the like, or by initial settings. In addition, the setting unit can set a predetermined region with respect to the image, an exit determination region that is smaller than the predetermined region, and an entry determination region that is smaller than the exit determination region.

The PTZ driving apparatus A1003 is an apparatus configured to change an angle of view and is configured by a driving apparatus such as a motor to perform pan/tilt/zoom control, as well as PTZ driving based on a PTZ control value that has been input from the angle of view control operation unit A1012. It should be noted that it is sufficient for the PTZ driving apparatus A1003 in the Present Embodiment to be capable of at least one of the three driving operations of pan, tilt, and zoom.

The information processing apparatus A1004 performs image analysis processing, determination processing, and the like. The information processing apparatus A1004 performs tracking processing based on the coordinates of a detected face by using the video that has been input, and the composition setting (setting related to the position at which the tracking target subject is displayed within the screen and the size at which it is displayed, and the like) that have been input by the user.

Furthermore, in a case in which the tracking target subject is inside a region that has been input by the user (predetermined region), the angle of view is moved to that region and the angle of view is then fixed, and the angle of view control is switched according to the position of the tracking target subject so that the angle of view control based on the composition setting is performed when the tracking target subject exits the predetermined region.

That is, in a case in which it is determined that a target object exists outside the predetermined target region that has been set (does not exist inside the predetermined region), the image capturing range (angle of view) is controlled by using the PTZ driving unit such that the target object becomes the composition (display position within the screen and display size, and the like) set by the setting unit.

The information processing apparatus A1004 includes a video acquisition unit A1005, a face detection unit A1006, a tracking setting unit A1007, a tracking setting recording unit A1008, a tracking processing unit A1009, a region inside/outside determination unit A1010, and an angle of view operation calculation unit A1011. Further, the information processing apparatus A1004 includes an angle of view operation unit A1012 and a video output unit A1013. The video acquisition unit A1005 outputs the acquired video to the face detection unit A1006 and the video output unit A1013.

The face detection unit A1006 performs face detection processing of a human body in the video by performing image recognition based on video information that has been input via the video acquisition unit A1005. It should be noted that, in the face detection processing, any method capable of detecting a face from an image can be used. Examples thereof include a template matching method and a semantic segmentation method.

The template matching method and the semantic segmentation method are known techniques, and thus detailed descriptions thereof are omitted. It should be noted that the face detection unit A1006 functions as a detection unit that detects a predetermined target object from an image that has been captured by an image capturing unit. In addition, as described above, the target object to be detected is not limited to a human body or the face thereof, but can also be an animal or the face thereof, or a moving body. The face detection unit A1006 outputs the coordinates of a face detected from each video information to the tracking processing unit A1009.

When the tracking settings are input from the user input acquisition unit A1002, the setting unit A1007 reflects such tracking settings and outputs such tracking settings to the tracking setting recording unit A1008. In the present embodiment, tracking settings are set to be of the two types of a region setting and a composition setting, but other settings such as a tracking sensitivity setting may also be set. A composition setting will be explained with reference to FIGS. 2A and 2B.

Figure 2A:
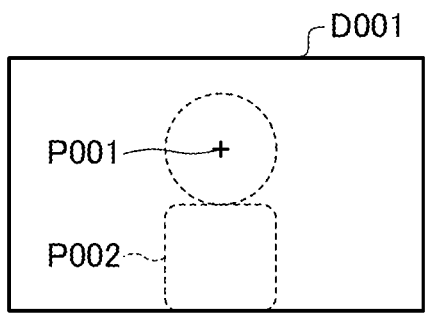
FIGS. 2A and 2B are diagrams explaining a composition setting according to the First Embodiment of the present invention.
Figure 2B:
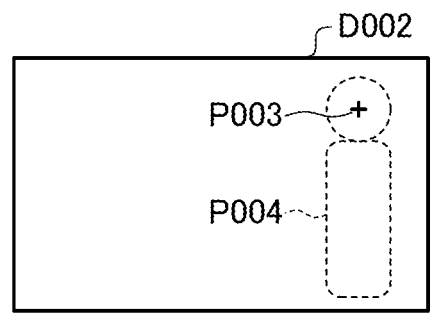
Figure 3A:
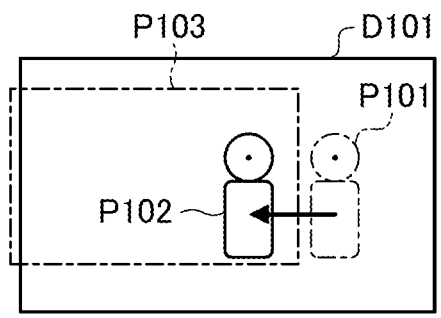
FIGS. 3A to 3D are diagrams explaining an example of performing angle of view control in accordance with a composition setting by fixing an angle of view by moving the angle of view to a predetermined region when a tracking target subject enters a predetermined region, and then releasing the fixed angle of view when the tracking target subject has exited from the predetermined region.
Figure 3B:
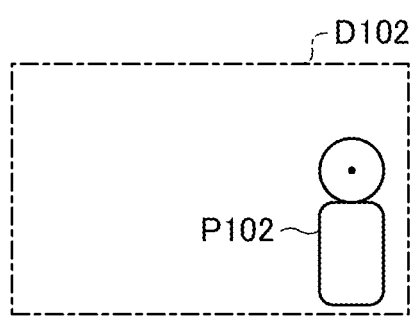
Figure 3C:
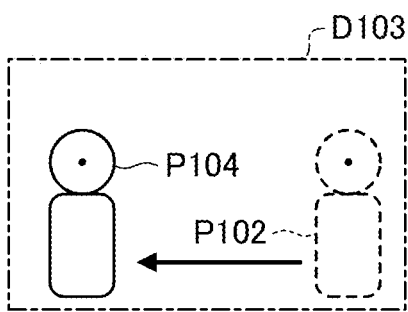
Figure 3D:
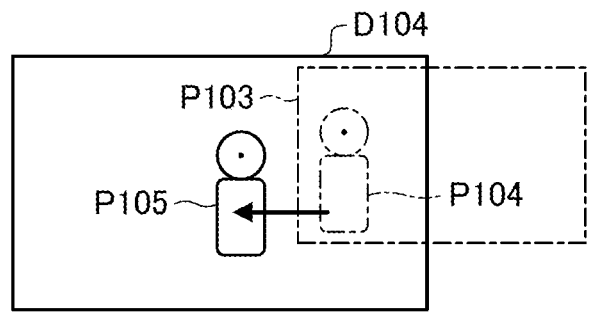

FIGS. 2A and 2B are diagrams explaining a composition setting according to the First Embodiment of the present invention. A composition setting is a setting that defines position and size, and the like, in a screen so as to continue to capture the tracking target subject in a specific position even if the subject moves within the screen, and, even in a case in which the size of the tracking target subject within the screen changes.

FIGS. 2A and 2B are diagrams that each show an example of a different composition setting, and D0W and D002 are conceptual diagrams of each composition setting. P001 and P003 represent positions in which a tracking target is displayed, and P002 and P004 represent the size at which the tracking target is displayed. In D001, the composition is such that the tracking target moves to the center of the screen, and the size represents a composition setting such that the upper body of the tracking target fits within the screen.

In D002, the composition is such that the tracking target moves to the upper right corner of the screen, and the size represents a composition setting such that the entire body of the tracking target fits within the screen. Switching between a region setting and angle of view control will be explained with reference to FIGS. 3A to 3D.

FIGS. 3A to 3D are diagrams explaining an example of performing angle of view control in accordance with the composition setting by fixing the angle of view through moving the angle of view to a predetermined region when the tracking target subject enters that predetermined region, and, subsequently, releasing the fixed angle of view when the tracking target subject exits from the predetermined region.

Screens D101, D102, and D103 show examples of the angle of view when a tracking target subject enters inside a predetermined region (a region preset by the user) P103. In the screen D101, a state is shown in which the tracking target subject has moved from a position P101 to a position P102, and the position P102 is inside the predetermined region (a region preset by the user) P103.

At this time, the screen D102 represents the change made to the angle of view of screen D101 so as to match the predetermined region P103. While the tracking target subject is inside the region P103, the angle of view is fixed, even if the tracking target subject moves within the region P103. This state is represented by the screen D103. Even if the tracking target subject moves from the position P102 to the position P104 within this region P103, the image capturing direction does not move and the image capturing size does not change. That is, the angle of view does not change.

Thereby, in a case in which it is determined that the tracking target subject as a target object exists inside a predetermined region that has been set (has entered an entry determination region), the PTZ driving apparatus controls the image capturing range (image capturing angle of view) so that the above-described predetermined region is included in the image capturing range. Furthermore, in such a case, the image capturing range (image capturing angle of view) is controlled by the PTZ driving apparatus so that the position and size of the image capturing range correspond to the above-described predetermined region.

When the tracking target subject exits to the outside of region P103, the fixed angle of view is released, and the angle of view is increased so as to capture the tracking target subject. This state is represented by a screen D104. By the movement of the tracking target subject from the position P104 to the position P105, which is outside of the region P103, the image capturing angle of view is increased from the angle of view corresponding to the region P103, and also moves in accordance with the position P105 and changes to the state of the screen D104.

The tracking setting unit A1007 outputs the above-described region setting and composition setting as tracking settings to the region inside/outside determination unit A1010 and the angle of view operation calculation unit A1011. The tracking setting recording unit A1008 records the tracking settings that have been input from the tracking setting unit A1007. The tracking setting recording unit A1008 also outputs tracking settings to the tracking setting unit A1007.

The tracking processing unit A1009 performs tracking processing based on the face information that has been input from the face detection unit A1006. That is, in a case in which tracking processing has not been performed, the tracking process is started by selecting a tracking target, and, in a case in which tracking processing has already been performed, the tracking process is performed by inputting the detected face information. The selection of the tracking target can be any method in which a single target can be selected from among a plurality of face information.

For example, the face closest to the center of the screen may be made the tracking target. The tracking processing may be any method in which the position information in the previous frame of the selected tracking target, and the position information of the tracking target in the current frame based on the input facial information, can be known. For example, tracking may be based on the predicted position based on the movement history of the tracking target and the position of the face that has been detected. The tracking processing result is output to the region inside/outside determination unit A1010.

The region inside/outside determination unit A1010 performs a determination as to whether the tracking target is inside or outside the predetermined region (the set region), based on tracking processing results that have been input from the tracking processing unit A1009, and region settings that have been input from the tracking setting unit A1007.

It should be noted that the region inside/outside determination unit A1010 functions as a determination unit that performs a determination as to whether or not a target object exists inside a predetermined region. In addition, the determination unit performs exit determination based on whether or not the target object has exited from an exit determination region, and performs entry determination based on whether or not the target object has entered into an entry determination region.

Figure 4A:
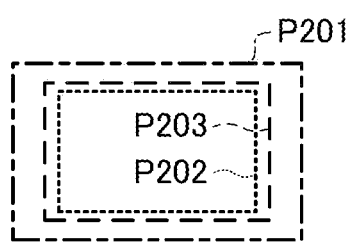
FIGS. 4A and 4B are diagrams explaining an entry determination region and an exit determination region within a region setting, and a configuration setting, according to a First Embodiment of the present invention.
Figure 4B:
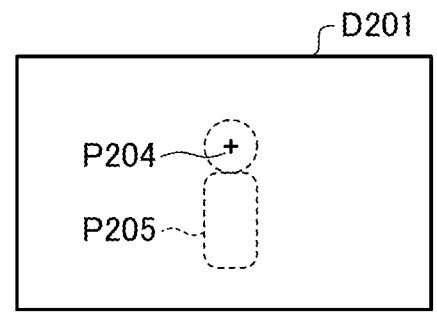

An example of an input tracking setting is explained in FIGS. 4A and 4B. FIGS. 4A and 4B are diagrams explaining the entry determination region and the exit determination region within the region setting, and the configuration setting, according to the First Embodiment of the present invention. P201 represents a predetermined region (region that has been set), P202 represents an entry determination region which determines entry into the region of P201, and P203 represents an exit determination region which determines an exit from the P201 region.

If the sizes of P202 and P203 are the same, in a case in which a tracking target subject stays at the boundary of a region, the determination of entry and exit will be performed repeatedly. Therefore, the relationship between the size of each of these regions is made P201>P203>P202. The size of each region can be any size provided that this relationship is maintained.

D201 is a screen representing an example of a composition setting. P204 represents the position in which the tracking target subject is displayed, and $P_2O_5$ represents the size of the tracking target subject. Next, the determination processing in the region inside/outside determination unit A1010 will be explained. First, the region inside/outside determination unit A1010 confirms whether the tracking target subject already exists inside the predetermined region. In a case in which a plurality of predetermined regions have been set, the region inside/outside determination unit A1010 confirms whether the tracking target subject exists inside any of the predetermined regions.

If the tracking target subject does not yet exist inside the predetermined region, the region inside/outside determination unit A1010 determines whether the tracking target has entered into the predetermined region from outside the predetermined region, and, in a case in which the tracking target subject already exists inside the predetermined region, the region inside/outside determination unit A1010 determines whether the tracking target subject has exited from the predetermined region. An example of determining an entry from outside the predetermined region into the predetermined region will be explained by using FIG. 5

Figure 5:
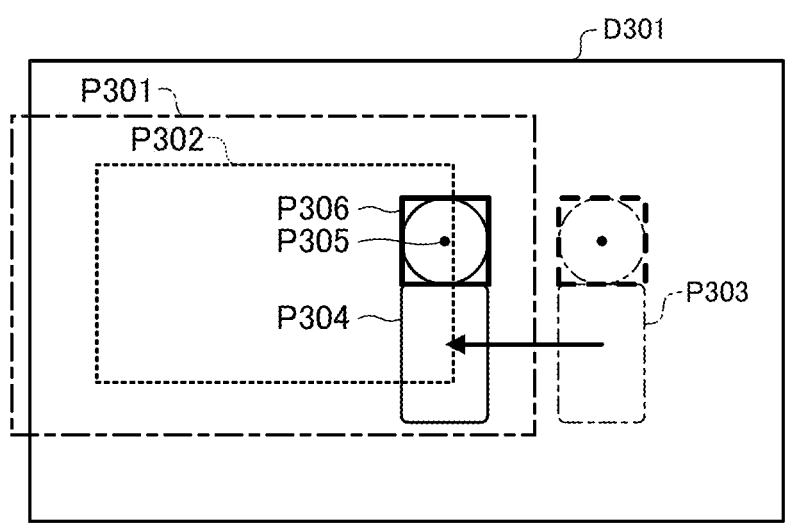
FIG. 5 is a diagram explaining an example of a tracking target subject that has entered the inner side of an entry determination region within a region setting in the First Embodiment of the present invention.

FIG. 5 is a diagram explaining an example of a tracking target subject that has entered the inner side of an entry determination region within a predetermined region (region setting) in the First Embodiment of the present invention. D301 is a screen representing the image capturing angle of view. P301 represents the predetermined region, and P302 the entry determination region.

When the tracking target subject moves from a position P303 to a position P304, assume a case in which a center position P305 of a face frame P306 has been determined to have moved inside the entry determination region P302, based on the face detection result of the tracking target subject. In such a case, the region inside/outside determination unit A1010 determines that the tracking target subject has entered the predetermined region (set region) P301.

Then, the determination result and region information are output to the angle of view operation calculation unit A1011. That is, an entry is determined in a case in which the center of the face frame of the target object exists on the inner side of the entry determination region. It should be noted that an entry may be determined in a case in which the center of a face exists on the inner side of the entry determination region, and, in the present embodiment, the center of the face is assumed to include the center of the face frame.

Figure 6:
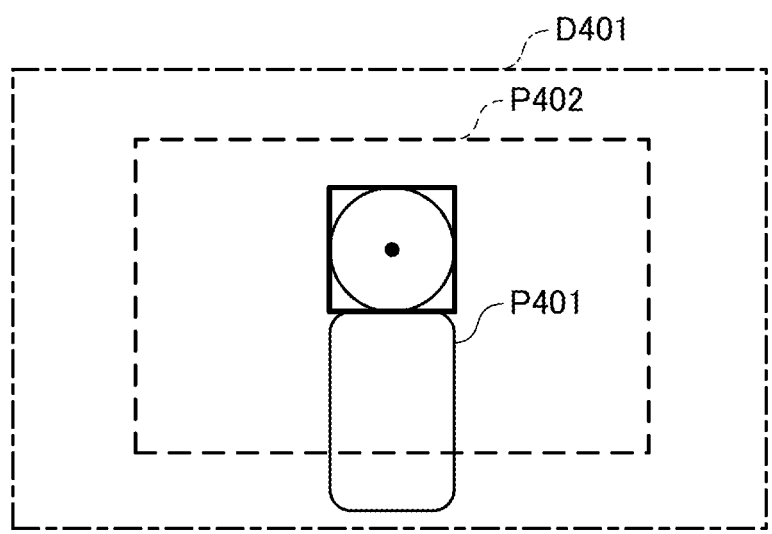
FIG. 6 is a diagram showing that a tracking target subject stays within a setting region in the First Embodiment of the present invention.

Next, a determination in a state in which the tracking target subject exists within a predetermined region will be explained with reference to FIG. 6 and FIG. 7. FIG. 6 is a diagram showing that the tracking target subject stays within a predetermined region (setting region) in the First Embodiment of the present invention, and FIG. 7 is a diagram showing a state in which the tracking target subject has exited to the outer side of the exit determination region within a predetermined region (setting region) in the First Embodiment of the present invention.

Figure 7:
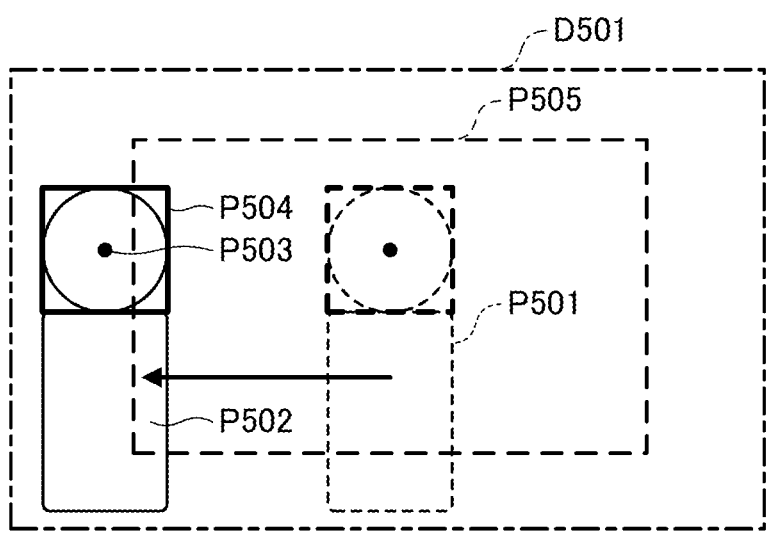
FIG. 7 is a diagram showing a state in which a tracking target subject has exited to the outer side of an exit determination region within a setting region in the First Embodiment of the present invention.

D401 of FIG. 6 and D501 of FIG. 7 represent the angle of view that has been set in accordance with the predetermined region P201 in FIG. 4. In FIG. 6, because the position P401 of the tracking target subject exists on the inner side of the exit determination region P402, the tracking target subject is determined to exist inside the predetermined region.

In FIG. 7, as a result of the tracking target subject moving from a position P501 to a position P502, a center position P503 of a face frame P504, which is the face detection result of a tracking target subject P502, is detected to be on the outer side of an exit determination region P505.

In that case, the tracking target subject is determined to have exited from the predetermined region. Then, the determination result is output to the angle of view operation calculation unit A1011. It should be noted that the tracking target subject may be determined to have exited in a case in which the center of the face exists on the outer side of the exit determination region, and, as previously described, the center of the face is assumed to include the center of the face frame.

Thereby, the region inside/outside determination unit A1010 performs an exit determination based on whether or not the target object (tracking target subject) has exited from an exit determination region that is smaller than the predetermined region that has been set, and performs an entry determination based on whether or not the target object has entered into an entry determination region that is smaller than the exit determination region.

The angle of view operation calculation unit A1011 calculates the angle of view value to be controlled based on the determination result and region information that has been input from the region inside/outside determination unit A1010, and the composition setting that has been input from the tracking setting unit A1007.

In a case in which a determination result in which it is determined that the tracking target subject continues to stay inside the predetermined region has been input, the same angle of view value as the current angle of view value is output to the angle of view operation unit A1012 so as to fix (maintain) the current angle of view. In a case in which a determination result in which it is determined that the tracking target subject has entered the predetermined region from outside the predetermined region has been input, the angle of view value that becomes the angle of view for the predetermined region that has been entered is output to the angle of view operation unit A1012.

In a case in which it has been determined that the tracking target subject has exited from the inside of the predetermined region to the outside of the predetermined region (has exited from the exit determination region), or when it is determined that the tracking target subject exists outside the predetermined region, an angle of view value is calculated such that the current position and size of the tracking target subject within the screen will become such that it corresponds to the position and size that have been specified in the composition setting. The angle of view value is then output to the angle of view operation unit A1012.

The angle of view operation unit A1012 calculates a PTZ control value from the angle of view value that has been input from the angle of view operation calculation unit A1011. The calculation of the PTZ control value may be by any method for controlling the input angle of view value, and may be a method for directly specifying the PTZ coordinate values, or a method for specifying direction and speed of pan and tilt.

The calculated PTZ control value is output to the PTZ driving apparatus A1003 so as to control the angle of view of the image capturing apparatus. Here, the angle of view operation calculation unit A1011 and the angle of view operation unit A1012 function as a control unit that controls the image capturing range of the image capturing unit according to a result that has been determined by the region inside/outside determination unit A1010.

The video output unit A1013 outputs the video that has been input via the video acquisition apparatus A1005 to an external apparatus A1014 such as a PC terminal. The external apparatus A1014 displays the image input from the video output unit A1013 on a monitor.

Figure 8:
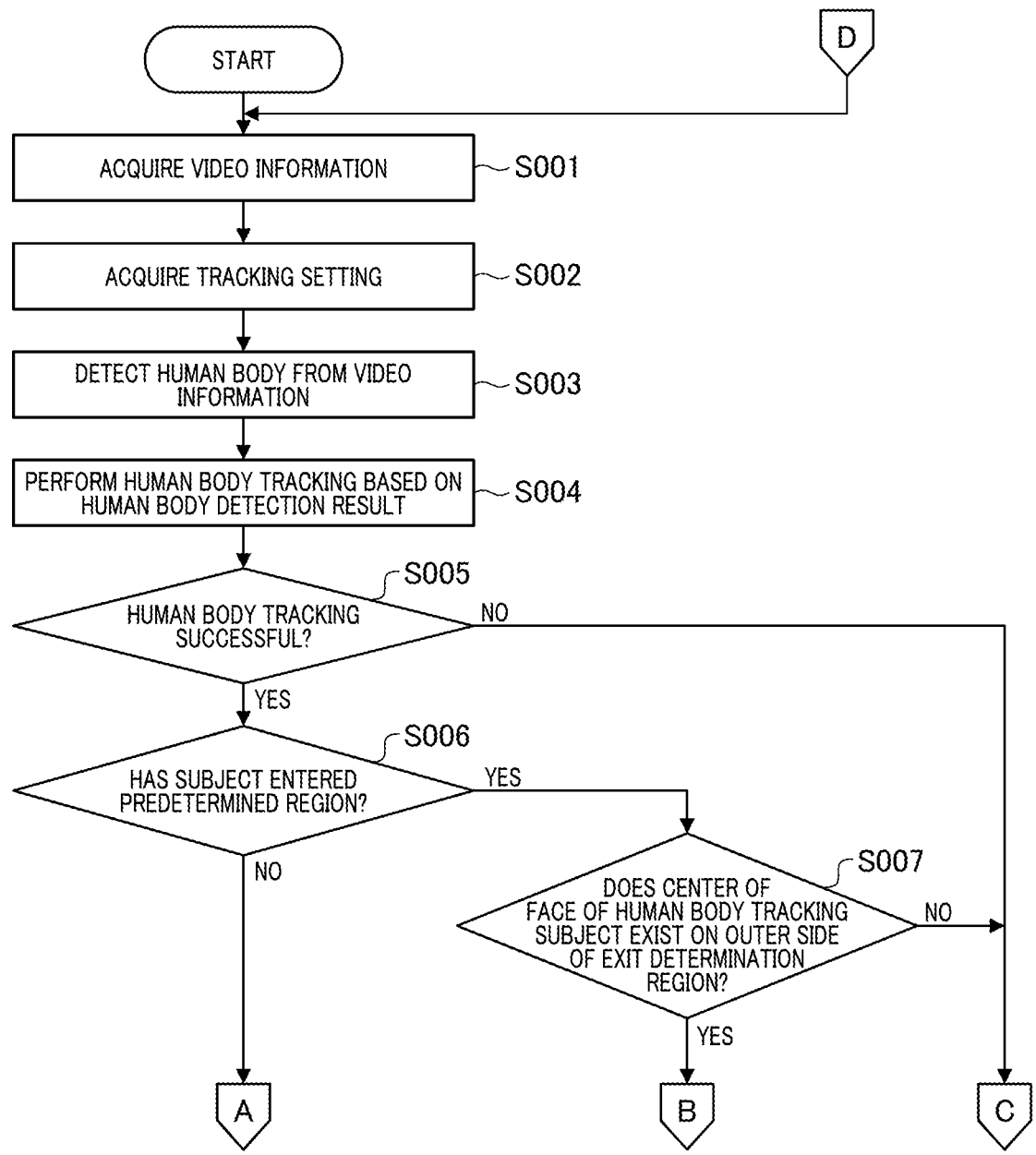
FIG. 8 is a flowchart showing the processing steps of the image capturing apparatus according to the First Embodiment of the present invention.

Next, processing steps performed by the image capturing apparatus will be explained with reference to the flowcharts of FIG. 8 and FIG. 9. FIG. 8 is a flowchart showing the processing steps of the image capturing apparatus according to the First Embodiment of the present invention, and FIG. 9 is a flowchart showing the continuation of the processing steps of FIG. 8.

Figure 9:
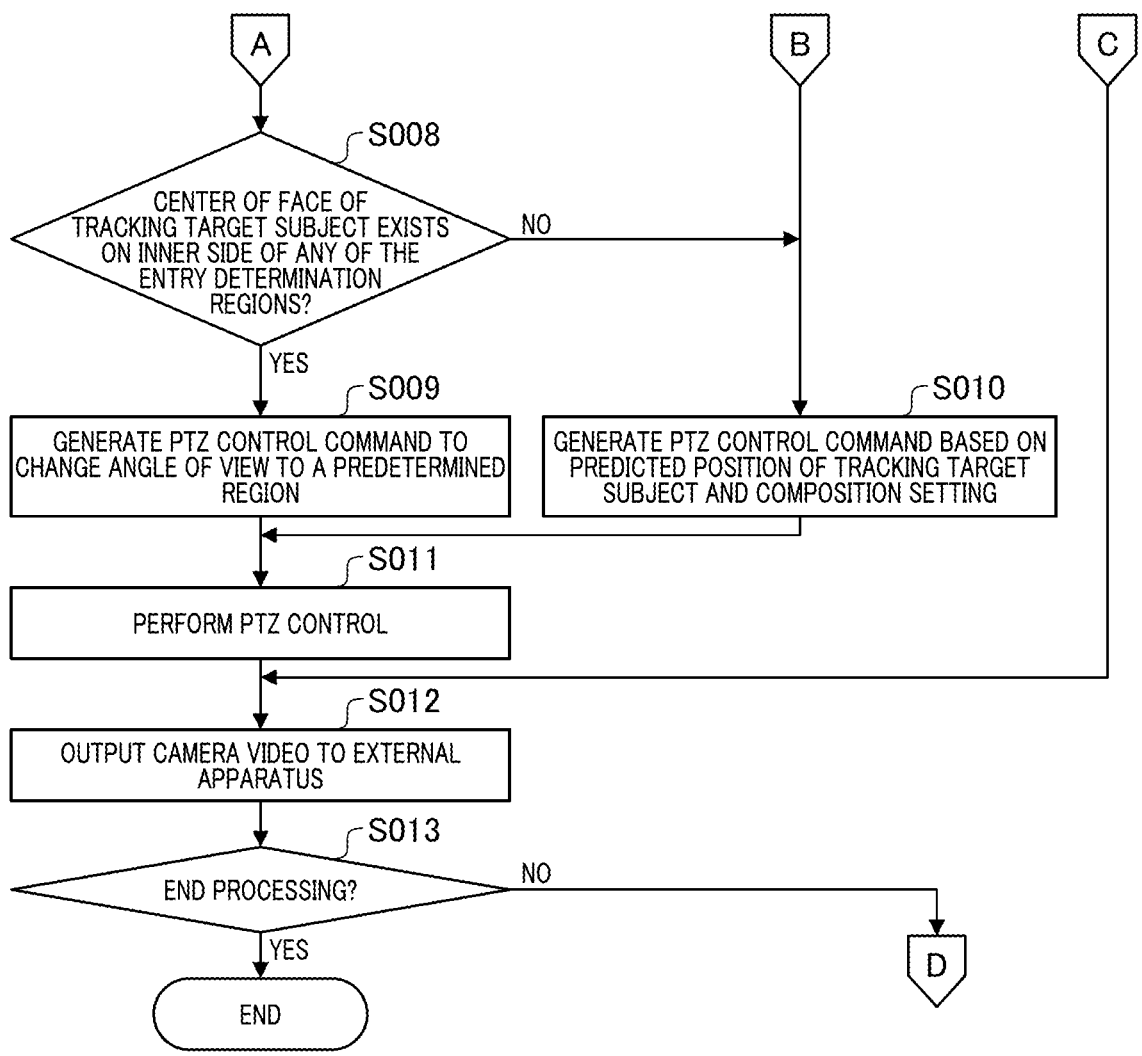
FIG. 9 is a flowchart showing the continuation of the processing steps of FIG. 8.

It should be noted that the operations of each step of the flowcharts of FIG. 8 and FIG. 9 are performed by a CPU, or the like, serving as a computer within the image capturing apparatus executing a computer program that has been stored in a memory.

When the image capturing apparatus A1020 of the automatic image capturing system A1000 is activated by a user operation, the flow shown in FIG. 8 and FIG. 9 is started. First, in step S001, the video acquisition unit A1005 acquires video information from the video acquisition apparatus A1001, and outputs the video information to the face detection unit A1006 and the video output unit A1013. Then, the processing proceeds to step S002.

In step S002, the user input acquisition unit A1002 acquires the region information and composition setting (setting indicating the position at which the tracking target subject is displayed within the screen and the size at which it is displayed within the screen, and the like), as well as the automatic selection setting for the tracking target subject that has been set by the user, and outputs the acquired region information, the composition setting, and the automatic selection setting for the tracking target subject to the tracking setting unit A1007. The tracking setting unit A1007 outputs and records the input region information, the composition setting, and the automatic selection setting of the tracking target to the tracking setting recording unit A1008.

Then, the processing proceeds to step S003. Here, step S002 functions as a setting step of setting a predetermined region with respect to the image. It should be noted that the setting step can set a predetermined region with respect to the image, an exit determination region that is smaller than the predetermined region, and an entry determination region that is smaller than the exit determination region.

In step S003, the face detection unit A1006 performs face detection as human body detection by image recognition based on the video information that has been input. Further, the detected face information and video information are output to the tracking processing unit A1009. Then, the processing proceeds to step S004. Here, step S003 functions as a detection step of detecting a predetermined target object from the image captured by the image capturing unit.

In step S004, the tracking setting unit A1007 selects a tracking target from the face information as a result of human body detection that has been input, and performs tracking processing. In addition, the tracking setting unit A1007 outputs the coordinate information of the tracking target subject to the region inside/outside determination unit A1010 as a result of the tracking processing. Then, the processing proceeds to step S005.

In step S005, the tracking setting unit A1007 determines whether the tracking processing of the human body (face) was successful. In the case of "Yes" in step S005, the processing proceeds to step S006. In the case of "No" in step S005, the processing proceeds to step S012 of FIG. 9 via C of FIG. 8.

In step S006, the region inside/outside determination unit A1010 determines whether the tracking target subject is inside the predetermined region. This determination processing is processing in which the tracking target subject is first confirmed to already exist inside the predetermined region. It should be noted that, in a case in which a plurality of predetermined regions have been set, the determination processing confirms whether the tracking target subject exists inside any of the predetermined regions.

In the case of "Yes" in step S006, that is, in a case in which the tracking target subject exists inside a predetermined region, the processing proceeds to step S007. In the case of "No" in step S006, that is, in a case in which the tracking target subject does not exist inside a predetermined region, the processing proceeds to step S008 of FIG. 9 via A of FIG. 8.

In step S007, the region inside/outside determination unit A1010 determines whether the center of the face frame (or face) of the tracking target subject exists on the outer side of the exit determination region. That is, in step S007, the region inside/outside determination unit A1010 determines whether the tracking target subject that is inside the predetermined region in step S006 has exited from the exit determination region within the predetermined region.

In the case of "Yes" in step S007, that is, in a case in which the tracking target subject has exited from the exit determination region within the predetermined region, the processing proceeds to step S010 of FIG. 9 via B of FIG. 8. In the case of "No" in step S007, that is, in a case in which the tracking target subject has not exited the exit determination region and continues to remain within the predetermined region, such information is output to the angle of view operation calculation unit A1011, and the processing proceeds to step S012 of FIG. 9 via C of FIG. 8.

In step S008 of FIG. 9, the region inside/outside determination unit A1010 determines whether the center of the face frame of the tracking target subject exists on the inner side of any entry determination region, and outputs the determination result to the angle of view operation calculation unit A1011. That is, in step S008, it is determined whether the tracking target subject that was not inside the predetermined region in step S006 has entered an entry determination region within the predetermined region.

In the case of "Yes" in step S008, that is, in a case in which the tracking target subject has entered an entry determination region within the predetermined region, the processing proceeds to step S009. In the case of "No" in step S008, that is, in a case in which the tracking target subject has not entered an entry determination region within the predetermined region, the processing proceeds to step S010.

Here, step S006 to step S008 function as a determination step that performs a determination as to whether or not a target object exists inside a predetermined region. Furthermore, in this determination step, exit determination is performed based on whether or not the target object (tracking target subject) has exited from an exit determination region that is smaller than the predetermined region that has been set, and entry determination is performed based on whether or not the target object has entered into an entry determination region that is smaller than the exit determination region.

In step S009, the angle of view operation calculation unit A1011 calculates the angle of view control value for changing the angle of view to the predetermined region into which the tracking target has entered, outputs this angle of view control value to the angle of view operation unit A1012, and then generates a PTZ control command. Then, the processing proceeds to step S011.

In contrast, in step S010, the angle of view operation calculation unit A1011 calculates the angle of view control value for displaying the tracking target within the screen in accordance with the predicted position of the tracking target subject and the composition setting acquired from the tracking setting unit A1007, outputs this angle of view control value to the angle of view operation unit A1012, and generates a PTZ control command. Then, the processing proceeds to step S011.

In step S011, the angle of view operation unit A1012 outputs the PTZ control command to the PTZ driving apparatus A1003 based on the angle of view control value that has been input from the angle of view operation calculation unit A1011. In addition, the PTZ driving apparatus A1003 changes the image capturing angle of view by PTZ driving. Then, the processing proceeds to step S012. Here, step S011 functions as a control step for controlling the image capturing range of the image capturing unit according to the result that has been determined by the determination step.

In step S012, the video output unit A1013 outputs the video information that has been input to the external apparatus A1014. Then, the processing proceeds to step S013.

In step S013, it is determined whether a stop operation to turn off the image capturing device A1020 has been performed by a user operation. In the case of "No" in step S013, the processing returns to step S001 of FIG. 8 via D of FIG. 9, and in the case of "Yes" in step S013, the automatic image capturing processing is ended, and the flows of FIGS. 8 and 9 are ended.

As described above, in the First Embodiment, in a case in which tracking processing is performed based on face detection, an entry determination region and an exit determination region having different sizes are provided on the inner side of a predetermined region, and it is determined that an entry has occurred when the center of the face frame (or face) of the tracking target enters the inner side of an entry determination region. Furthermore, it is determined that an exit has occurred when the center of the face frame (or face) of the tracking target exits to the outer side of the exit determination region. Thereby, it is possible to continue angle of view control while maintaining tracking without losing sight of the face at the time of exit determination.

Second Embodiment

Figure 10:
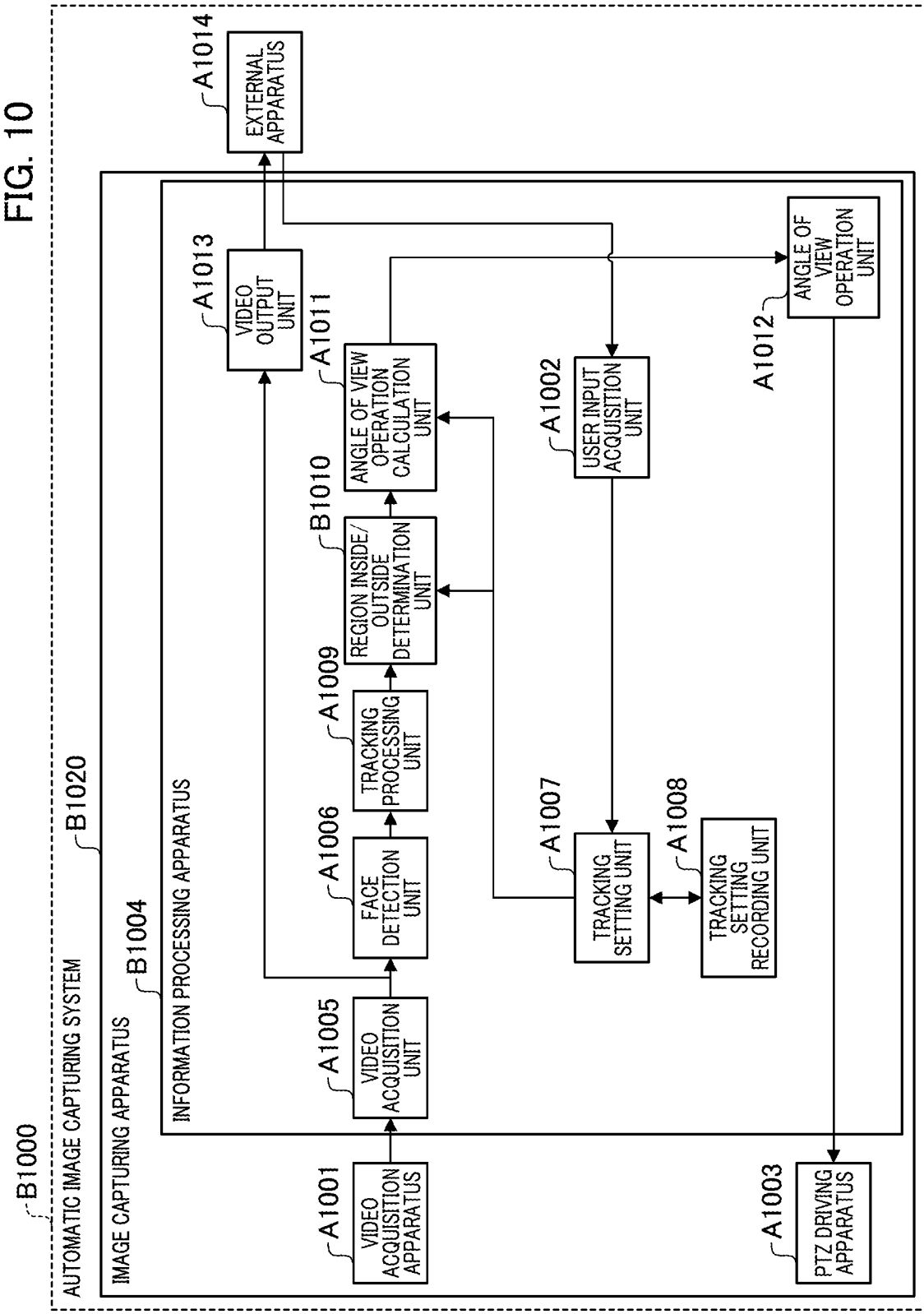
FIG. 10 is a functional block diagram of an automatic image capturing system according to a Second Embodiment of the present invention.

An exemplary configuration of an automatic image capturing system B1000 according to a Second Embodiment of the present invention will be explained with reference to FIG. 10. FIG. 10 is a functional block diagram of the automatic image capturing system according to the Second Embodiment of the present invention.

In the Second Embodiment, in order to prevent losing sight of the face of the tracking target subject from the screen at the time of exit determination, the sizes of the exit determination region and the entry determination region are dynamically changed according to the size of the face of the tracking target subject within the screen.

The automatic image capturing system B1000 performs tracking processing based on the video acquired via the video acquisition unit A1005 and the tracking settings acquired from the user input acquisition unit A1002, and performs angle of view control by using the PTZ driving apparatus A1003 so that the tracking target does not deviate from the angle of view.

At that time, a determination is performed as to whether or not the tracking target is inside a predetermined region (a region that has been set), and the angle of view control is switched between when the tracking target is inside the predetermined region and when the tracking target is outside the predetermined region. Then, the image capture result is displayed on the external apparatus A1014. The automatic image capturing system B1000 includes an image capturing apparatus A1020 that comprises a video acquisition apparatus A1001, a PTZ driving apparatus A1003, and an information processing apparatus B1004, and also includes an external apparatus A1014.

The image capturing apparatus and the external apparatus A1014 are connected via a network. In addition, the image capturing apparatus and the external apparatus A1014 may be connected via a video interface.

The information processing apparatus B1004 performs image analysis processing, determination processing, and the like. The information processing apparatus B1004 performs tracking processing based on the coordinates of the detected face by using the video that has been input and the composition setting that has been set. In addition, in a case in which a tracking target subject is inside a predetermined region (a region that has been set), the angle of view is adjusted so as to encompass the predetermined region and then fixed, and the angle of view control is switched according to the position of the tracking target subject so that angle of view control based on the composition setting is performed when the tracking target subject exits the predetermined region.

The information processing apparatus B1004 includes a video acquisition unit A1005, a face detection unit A1006, a tracking setting unit A1007, a tracking setting recording unit A1008, a tracking processing unit A1009, a region inside/outside determination unit B1010, and an angle of view operation calculation unit A1011. Further, the information processing apparatus B1004 includes an angle of view operation unit A1012 and a video output unit A1013.

The region inside/outside determination unit B1010 performs a determination as to whether the tracking target is inside or outside the predetermined region, based on the tracking processing result that has been input from the tracking processing unit A1009 and the region setting that has been input from the tracking setting unit.

In the Present Embodiment, the sizes of the exit determination region and the entry determination region are dynamically changed according to the size of the face of the tracking target subject in order to prevent losing sight of the face of the tracking target subject from the screen at the time of exit determination. This state is explained in FIG. 11 and FIG. 12.

Figure 11:
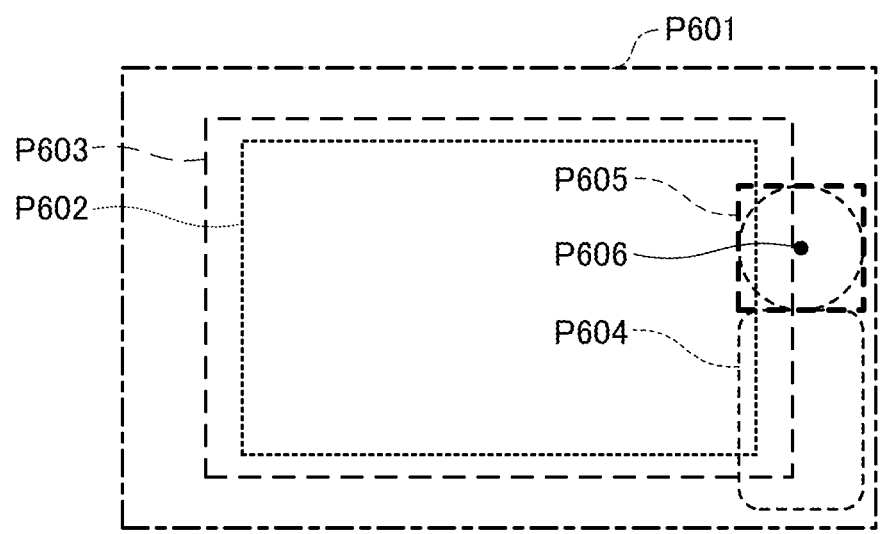
FIG. 11 is a diagram illustrating the determination of the size of an exit determination region and an entry determination region when the face of a tracking target subject is small in the Second Embodiment of the present invention.
Figure 12:
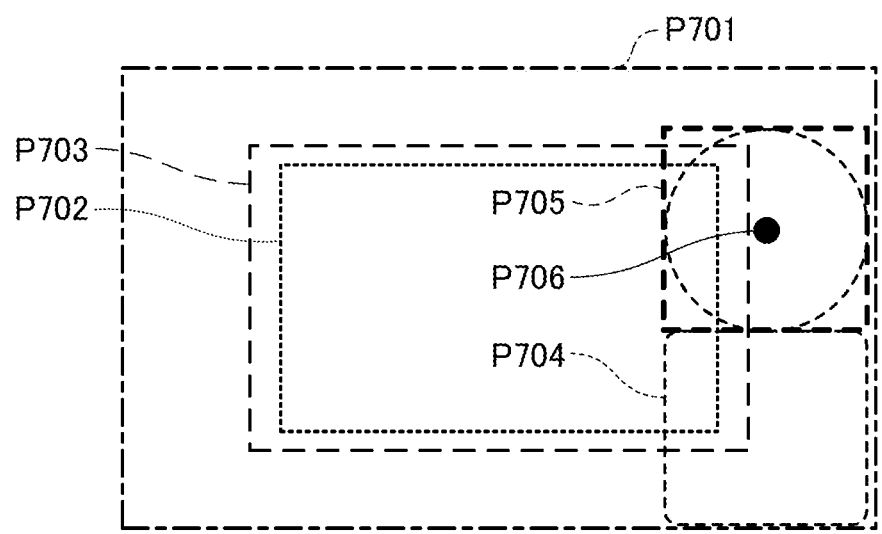
FIG. 12 is a diagram illustrating the determination of the size of an exit determination region and an entry determination region when the face of a tracking target subject is large in the Second Embodiment of the present invention.

FIG. 11 is a diagram illustrating the determination of the size of an exit determination region and an entry determination region when the face of a tracking target subject is small in the Second Embodiment of the present invention. In addition, FIG. 12 is a diagram illustrating the determination of the size of an exit determination region and an entry determination region when the face of a tracking target subject is large in the Second Embodiment of the present invention.

P601 represents a predetermined region (a region that has been set), P604 represents the tracking target subject, P605 represents the face frame as a result of face detection of the tracking target subject, and P606 represents the center position of the face frame of the tracking target subject. Furthermore, P602 represents the entry determination region, and P603 represents the exit determination region. Here, an example is shown in which the tracking target subject is at the edge of the screen so as to make it easier to understand how the size of the entry determination region and the exit determination region is determined. However, the size of a region can be determined even if the tracking target subject is not at this position.

In the Present Embodiment, as shown in FIG. 11, the exit determination region P603 is set such that the difference in size between the exit determination region P603 and the predetermined region (region that has been set) P601 becomes a size larger than, for example, half the length of the side of the face frame P605 of the tracking target subject P604.

The entry determination region P602 is set to be smaller than the exit determination region P603. In contrast, even in a case in which the size of the tracking target subject is large, as shown in FIG. 12, the size of the exit determination region is dynamically set in a similar manner. In FIG. 12, P701 represents a predetermined region (region that has been set), P704 represents the tracking target subject, P705 represents the face frame of the tracking target subject, and P706 represents the center position of the face frame of the tracking target subject.

As shown in FIG. 11, the exit determination region P703 is set such that the difference in size between the exit determination region P703 and the predetermined region (region that has been set) P701 becomes a size larger than, for example, half the length of the side of the face frame P705 of the tracking target subject P704.

The entry determination region P702 is set to be smaller than the exit determination region P703. The other determination processes in the region inside/outside determination unit B1010 are similar to those in the region inside/outside determination unit A1010. In addition, blocks other than those of the region inside/outside determination unit B1010 are similar to those of the First Embodiment, and an explanation thereof is therefore omitted.

Figure 13:
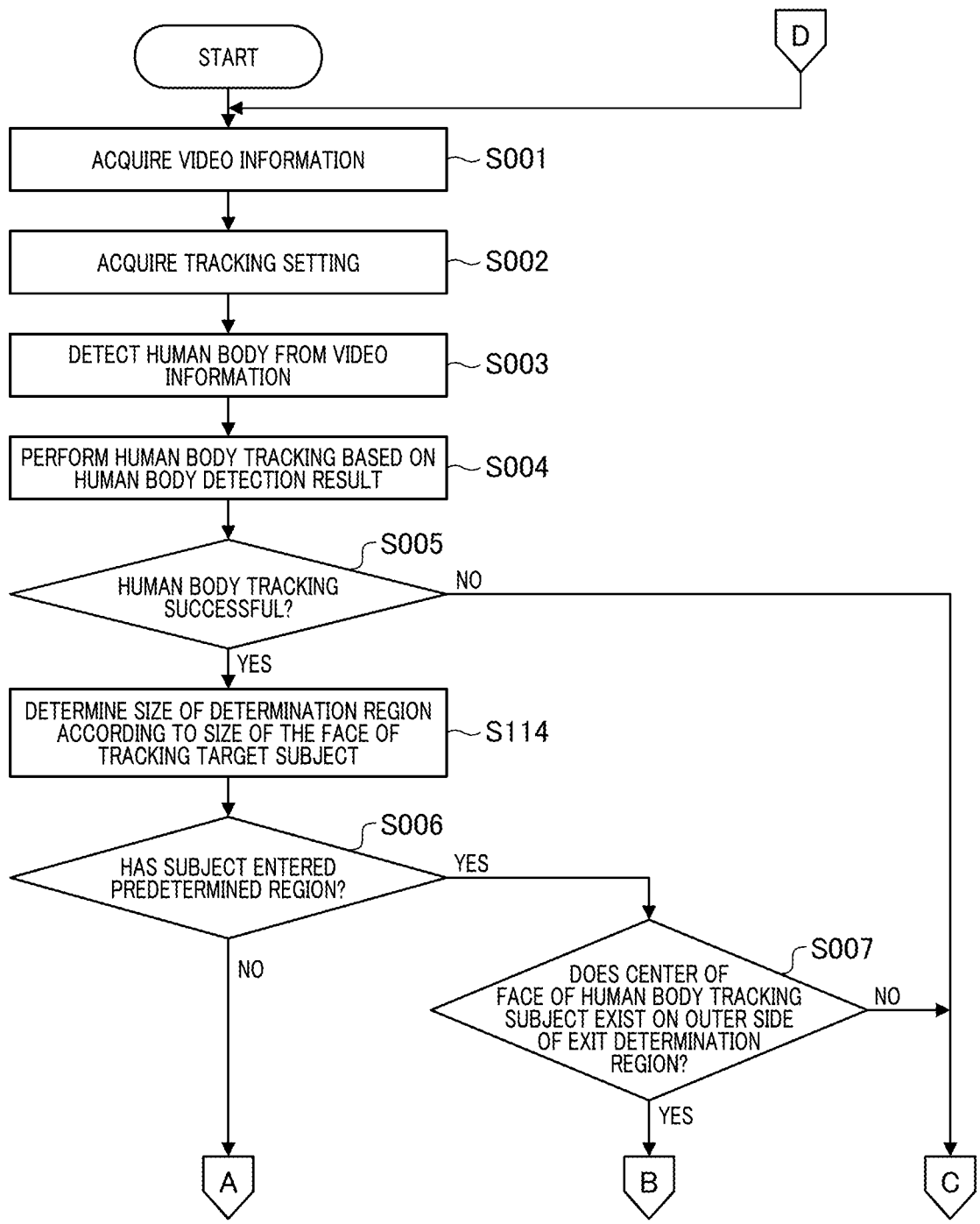
FIG. 13 is a flowchart showing the processing steps of an automatic image capturing system according to the Second Embodiment of the present invention.

Next, steps for performing the processing of the image capturing apparatus will be explained with reference to the flowcharts of FIG. 13 and FIG. 14. FIG. 13 is a flowchart showing the processing steps of the image capturing apparatus according to the Second Embodiment of the present invention, and FIG. 14 is a flowchart showing the continuation of the processing steps of FIG. 13.

Figure 14:
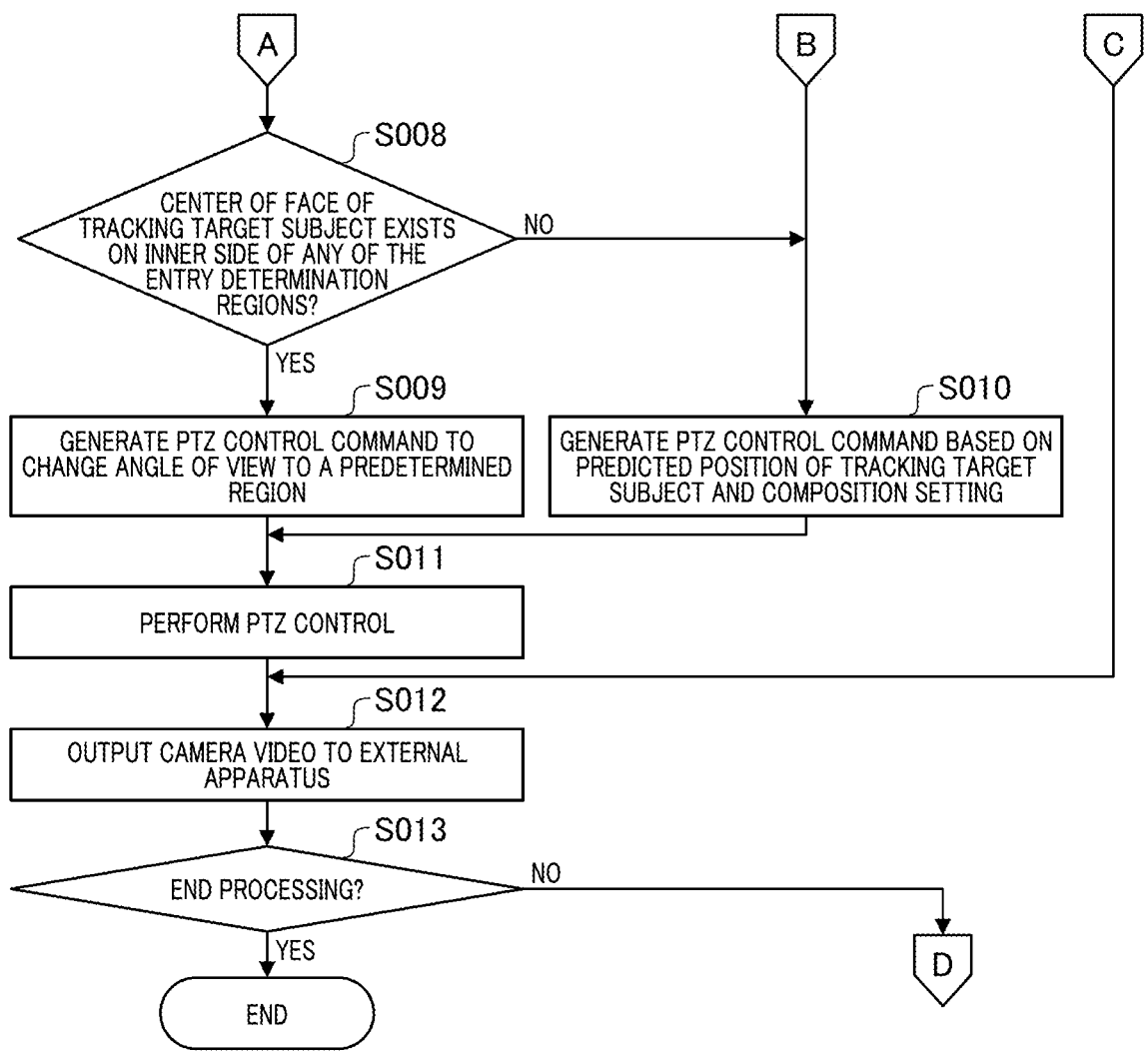
FIG. 14 is a flowchart showing the continuation of the processing steps of FIG. 13.

It should be noted that the operations of each step of the flowcharts of FIG. 13 and FIG. 14 are performed by a CPU, or the like, serving as a computer within the image capturing apparatus executing a computer program that has been stored in a memory.

When the image capturing apparatus B1020 of the automatic image capturing system B1000 is activated by a user operation, the flow shown in FIG. 13 and FIG. 14 is started. First, in step S001, the video acquisition unit A1005 acquires video information from the video acquisition apparatus A1001, and outputs the video information to the face detection unit A1006 and the video output unit A1013. Then, the processing proceeds to step S002.

In step S002, the user input acquisition unit A1002 acquires the region information and composition setting (setting indicating the position at which the tracking target subject is displayed within the screen and the size at which it is displayed within the screen, and the like), as well as the automatic selection setting for the tracking target subject that has been set by the user, and outputs the acquired region information, composition setting, and automatic selection setting for the tracking target subject to the tracking setting unit A1007. The tracking setting unit A1007 outputs and records the region information, composition setting, and automatic selection setting of the tracking target that have been input to the tracking setting recording unit A1008. Then, the processing proceeds to step S003.

In step S003, the face detection unit A1006 performs face detection as human body detection by image recognition based on the video information that has been input. The detected face information and video information are output to the tracking processing unit A1009. Then, the processing proceeds to step S004.

In step S004, the tracking setting unit A1007 selects a tracking target from the face information as the human body detection result that has been input and performs tracking processing. In addition, the tracking setting unit A1007 outputs the coordinate information of the tracking target subject to the region inside/outside determination unit B1010 as a result of the tracking processing. Then, the processing proceeds to step S005.

In step S005, the tracking setting unit A1007 determines whether the tracking processing of the human body (face) was successful. In the case of "Yes" in step S005, the processing proceeds to step S114. In the case of "No" in step S005, the processing proceeds to step S012 of FIG. 14 via C of FIG. 13.

In step S114, the region inside/outside determination unit B1010 dynamically determines the size of the entry determination region and the exit determination region of the setting region according to the size of the face of the tracking target subject. Then, the processing proceeds to step S006.

That is, in the Present Embodiment, the size of the entry determination region and the exit determination region is changed based on the size of the target object within the image capturing range. It should be noted that the size of at least one of the entry determination region and the exit determination region may be changed based on the size of the target object within the image capturing range.

In step S006, the region inside/outside determination unit B1010 determines whether the tracking target subject is inside the predetermined region. In the case of "Yes" in step S006, that is, in a case in which the tracking target subject exists inside a predetermined region, the processing proceeds to step S007. In the case of "No" in step S006, that is, in a case in which the tracking target subject does not exist inside a predetermined region, the processing proceeds to step S007 of FIG. 14 via A of FIG. 13.

In step S007, the region inside/outside determination unit B1010 determines whether the center of the face frame of the tracking target subject exists on the outer side of the exit determination region. That is, in step S007, the region inside/outside determination unit B1010 determines whether the tracking target subject that is inside the predetermined region in step S006 has exited from the exit determination region within the predetermined region.

In the case of "Yes" in step S007, that is, in a case in which the tracking target subject has exited from the exit determination region within the predetermined region, the processing proceeds to step S010 of FIG. 14 via B of FIG. 13. In the case of "No" in step S007, that is, in a case in which the tracking target subject has not exited the exit determination region and continues to remain within the predetermined region, such information is output to the angle of view operation calculation unit A1011, and the processing proceeds to step S012 of FIG. 14 via C of FIG. 13.

In step S008 of FIG. 14, the region inside/outside determination unit B1010 determines whether the center of the face frame of the tracking target subject exists on the inner side of any entry determination region, and outputs the determination result to the angle of view operation calculation unit A1011. That is, in step S008, it is determined whether the tracking target subject that was not inside the predetermined region in step S006 has entered an entry determination region within the predetermined region.

In the case of "Yes" in step S008, that is, in a case in which the tracking target subject has entered an entry determination region within the predetermined region, the processing proceeds to step S009. In the case of "No" in step S008, that is, in a case in which the tracking target subject has not entered an entry determination region within the predetermined region, the processing proceeds to step S010.

In step S009, the angle of view operation calculation unit A1011 calculates the angle of view control value for changing the angle of view to the predetermined region into which the tracking target has entered, outputs this angle of view control value to the angle of view operation unit A1012, and generates a PTZ control command. Then, the processing proceeds to step S011.

In contrast, in step S010, the angle of view operation calculation unit A1011 calculates the angle of view control value for displaying the tracking target within the screen in accordance with the predicted position of the tracking target subject and the composition setting acquired from the tracking setting unit A1007, outputs this angle of view control value to the angle of view operation unit A1012, and generates a PTZ control command. Then, the processing proceeds to step S011.

In step S011, the angle of view operation unit A1012 outputs the PTZ control command to the PTZ driving apparatus A1003 based on the angle of view control value that has been input from the angle of view operation calculation unit A1011. In addition, the PTZ driving apparatus A1003 changes the image capturing angle of view by PTZ driving. Then, the processing proceeds to step S012.

In step S012, the video output unit A1013 outputs the video information that has been input to the external apparatus A1014. Then, the processing proceeds to step S013.

In step S013, it is determined whether a stop operation to turn off the image capturing device has been performed by a user operation. In the case of "No" in step S013, the processing returns to step S001 of FIG. 13 via D of FIG. 14, and, in the case of "Yes" in step S013, the automatic image capturing processing is terminated, and the flows of FIG. 13 and FIG. 14 are ended.

As described above, in the Second Embodiment, in a case in which tracking processing is performed based on face detection, the size of the entry determination region and the size of the exit determination region are dynamically changed according to the size of the face of the tracking target subject positioned on the inner side of the predetermined region.

In addition, in a case in which the center of the face frame (or face) of the tracking target is on the inner side of the entry determination region, it is determined that the tracking target has entered, and, in a case in which the center of the face frame (or face) of the tracking target is on the outer side of the exit determination region, it is determined that the tracking target has exited. Thereby, it is possible to continue angle of view control while maintaining tracking without losing sight of the face at the time of exit determination.

Third Embodiment

Figure 15:
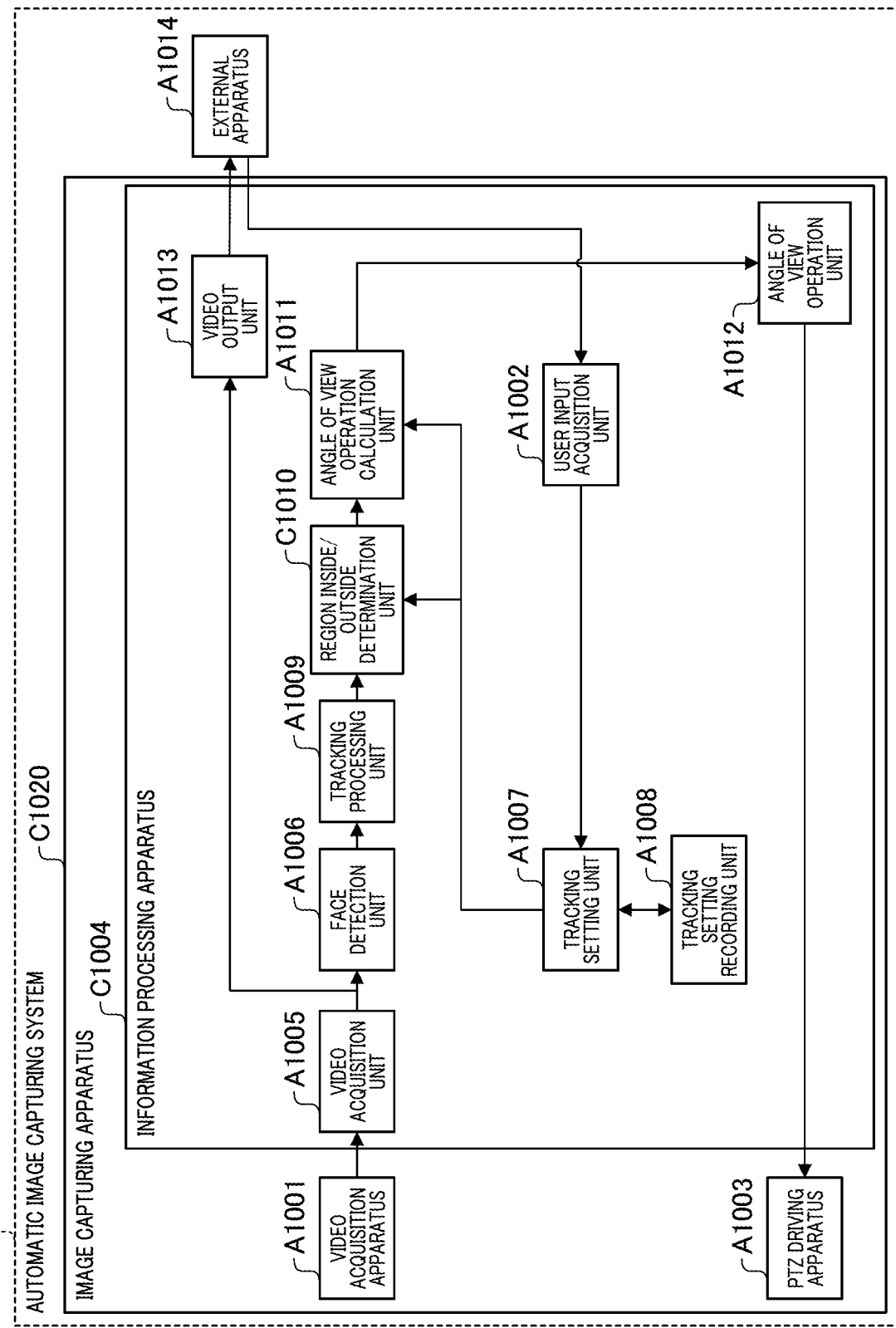
FIG. 15 is a functional block diagram of an automatic image capturing system according to the Third Embodiment of the present invention.

Next, an automatic image capturing system C1000 according to a Third Embodiment of the present invention will be explained with reference to FIG. 15. FIG. 15 is a functional block diagram of the automatic image capturing system C1000 according to the Third Embodiment of the present invention.

The Third Embodiment is a process for seamlessly switching the fixed angle of view control in a case in which a plurality of predetermined regions are set and a tracking target subject moves through a region in which the plurality of predetermined regions overlap.

The automatic image capturing system C1000 according to the present embodiment includes an image capturing apparatus C1020 that comprises a video acquisition apparatus A1001, a PTZ driving apparatus A1003, and an information processing apparatus C1004, and also includes an external apparatus A1014.

The image capturing apparatus and the external apparatus A1014 are connected via a network. In addition, the image capturing apparatus and the external apparatus A1014 may be connected via a video interface.

The image capturing apparatus of the present embodiment performs tracking processing based on a video acquired from the video acquisition apparatus A1001 and a tracking setting acquired from a user input acquisition unit A1002. Then, the image capturing apparatus performs angle of view control by using the PTZ driving apparatus A1003 so that the tracking target does not deviate from the angle of view.

Then, when performing angle of view control, a determination is performed so as to determine whether or not the tracking target is inside a predetermined region that has been set, and the angle of view control is switched between when the tracking target is inside the predetermined region and when it is outside the predetermined region. Then, the image capture result is displayed on the external apparatus A1014.

The information processing apparatus C1004 performs tracking processing based on the coordinates of the face detected by using the video that has been input and the composition setting that has been input by the user. Furthermore, in a case in which the tracking target subject is inside a region that has been input by the user (predetermined region), the angle of view is moved to that region and the angle of view is then fixed, and the angle of view control is switched according to the position of the tracking target subject so that the angle of view control based on the composition setting is performed when the tracking target subject exits the predetermined region.

The information processing apparatus C1004 includes a video acquisition unit A1005, a face detection unit A1006, a tracking setting unit A1007, a tracking setting recording unit A1008, a tracking processing unit A1009, a region inside/outside determination unit C1010, and an angle of view operation calculation unit A1011. Further, the information processing apparatus C1004 includes an angle of view operation unit A1012, and a video output unit A1013.

The region inside/outside determination unit C1010 performs a determination of whether the tracking target is inside or outside the predetermined region, based on tracking processing results that have been input from the tracking processing unit A1009 and region settings that have been input from the tracking setting unit.

In the Third Embodiment, in a case in which the tracking target subject moves through a region in which a plurality of predetermined regions overlap, it is determined whether the tracking target subject is inside the entry determination region of another predetermined region upon exiting a predetermined region, in order to seamlessly switch the fixed angle of view control.

Figure 16:
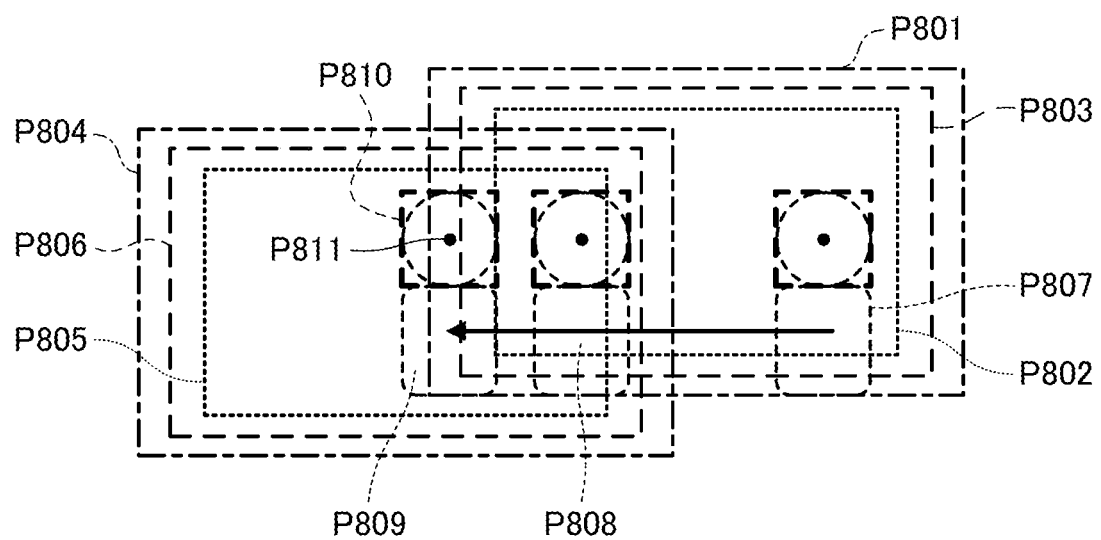
FIG. 16 is a diagram explaining a state of region inside/outside determination in a case in which a tracking target subject moves through a region in which region settings overlap, according to the Third Embodiment of the present invention.

This state is explained in FIG. 16. FIG. 16 is a diagram explaining a state of region inside/outside determination in a case in which a tracking target subject moves through a region in which a plurality of predetermined regions overlap, according to the Third Embodiment of the present invention.

A first predetermined region P801 and a second predetermined region P804 are set to overlap. The entry determination region of the predetermined region P801 is P802, and the exit determination region of the predetermined region P801 is P803. The entry determination region of the predetermined region P804 is P805, and the exit determination region of the predetermined region P804 is P806. When the tracking target subject moves from position P807 to position P808, it is determined to be inside the first predetermined region P801.

Next, when the tracking target subject moves from position P808 to position P809, the center position P811 of the face frame P810 of the tracking target subject P809 exists on the outer side of the exit determination region P803 of the first predetermined region P801 that has been set. Therefore, it is determined that the tracking target subject has exited to the outside of the first predetermined region P801.

However, in contrast, because the center position P811 exists on the inner side of the entry determination region P805 of the second predetermined region P804, it is determined that the tracking target subject has entered the second predetermined region P804. Thereby, in the Present Embodiment, in a case in which a plurality of predetermined regions are set, it is determined as to whether the target object has not entered another predetermined region after it has been determined that the target object has exited a predetermined region, thereby enabling seamless switching of angle of view control.

Other determination operations are similar to those of the region inside/outside determination unit B1010, and an explanation thereof is, therefore, omitted. In addition, the functions of other blocks are similar to those of the First Embodiment and Second Embodiment, and an explanation thereof is therefore omitted.

Figure 17:
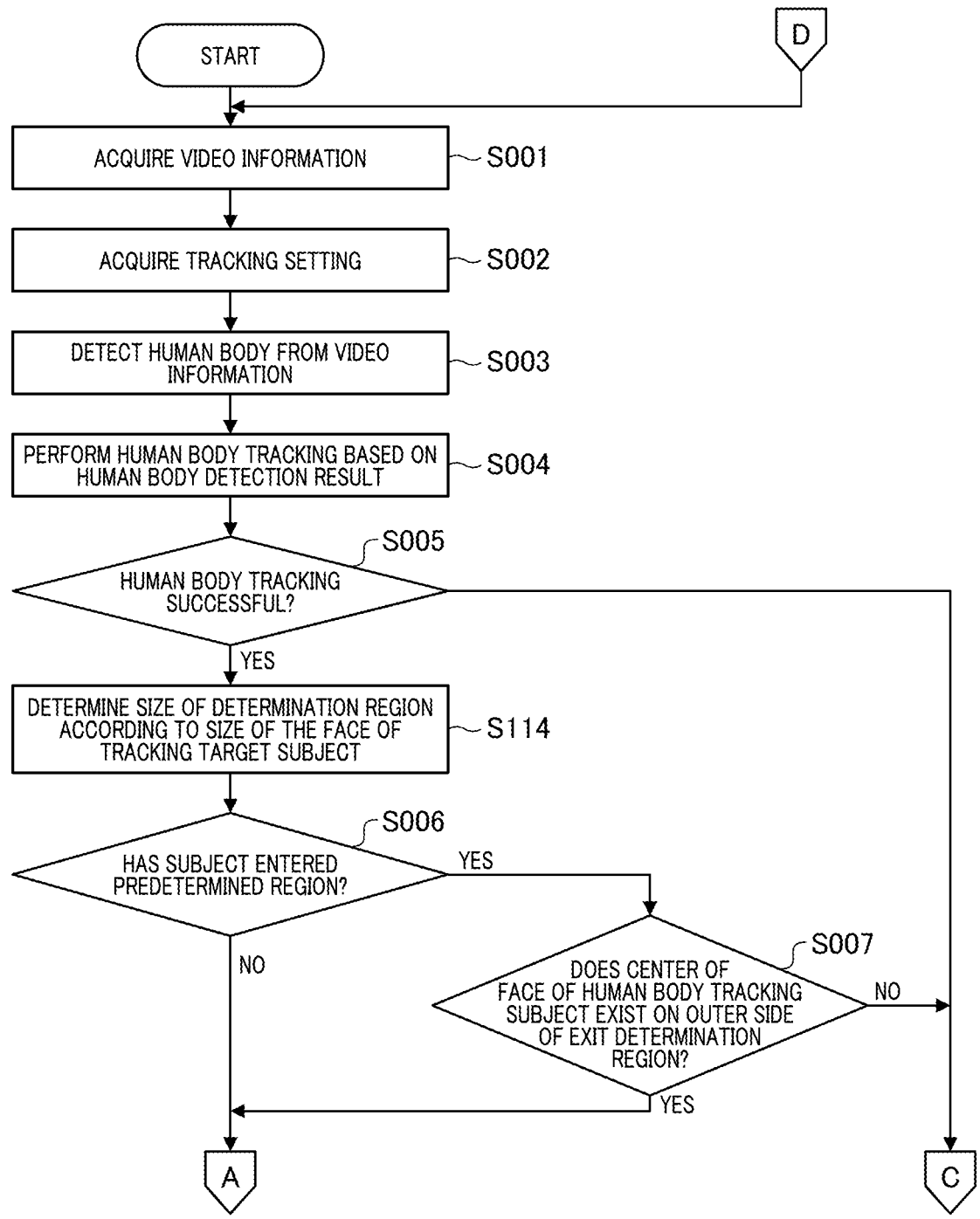
FIG. 17 is a flowchart showing the processing steps of the image capturing apparatus according to the Third Embodiment of the present invention.

Next, steps for performing the processing of the image capturing apparatus will be explained with reference to the flowcharts of FIG. 17 and FIG. 18. FIG. 17 is a flowchart showing the processing steps of the image capturing apparatus according to the Third Embodiment of the present invention, and FIG. 18 is a flowchart showing the continuation of the processing steps of FIG. 17.

Figure 18:
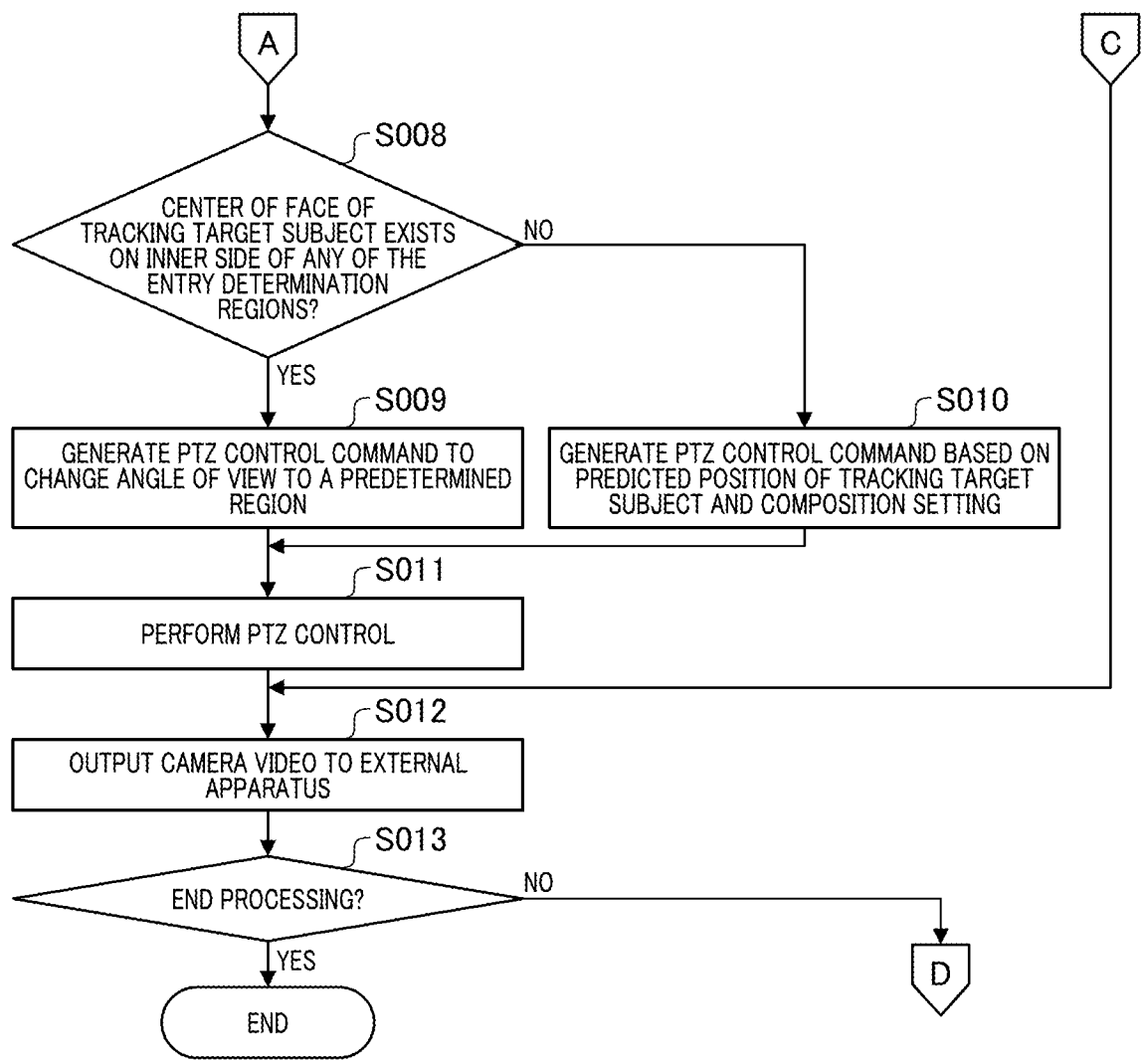
FIG. 18 is a flowchart showing the continuation of the processing steps of FIG. 17.

It should be noted that the operations of each step of the flowcharts of FIG. 17 and FIG. 18 are performed by a CPU, or the like, serving as a computer within the image capturing apparatus executing a computer program that has been stored in a memory.

When an image capturing apparatus of the automatic image capturing system C1000 is activated by a user operation, the flow shown in FIG. 17 and FIG. 18 is started. First, in step S001, the video acquisition unit A1005 acquires video information from the video acquisition apparatus A1001, and outputs the video information to the face detection unit A1006 and the video output unit A1013. Then, the processing proceeds to step S002.

In step S002, the user input acquisition unit A1002 acquires the region information and composition setting (setting indicating the position at which the tracking target subject is displayed within the screen and the size at which it is displayed within the screen, and the like) that has been set by the user, as well as the automatic selection setting for the tracking target subject that has been set by the user, and outputs the acquired region information, composition setting, and automatic selection setting for the tracking target subject to the tracking setting unit A1007. The tracking setting unit A1007 outputs and records the region information, composition setting, and automatic selection setting of the tracking target that have been input to the tracking setting recording unit A1008. Then, the processing proceeds to step S003.

In step S003, the face detection unit A1006 performs face detection as human body detection by image recognition based on the video information that has been input. Further, the detected face information and video information are output to the tracking processing unit A1009. Then, the processing proceeds to step S004.

In step S004, the tracking setting unit A1007 selects the tracking target from the face information that has been input and performs tracking processing. In addition, the tracking setting unit A1007 outputs the coordinate information of the tracking target subject to a region inside/outside determination unit C1008 as a tracking processing result. Then, the processing proceeds to step S005.

In step S005, the tracking setting unit A1007 determines whether the tracking processing of the human body (face) was successful. In the case of "Yes" in step S005, the processing proceeds to step S114. In the case of "No" in step S005, the processing proceeds to step S012 of FIG. 18 via C of FIG. 17.

In step S114, the region inside/outside determination unit C1008 dynamically determines the size of the entry determination region and the exit determination region of the setting region according to the size of the face of the tracking target subject. This processing is similar to that of the Second Embodiment. Note that, in the Present Embodiment, this step may be omitted. Then, the processing proceeds to step S006.

In step S006, the region inside/outside determination unit C1008 determines whether the tracking target subject is inside the predetermined region. This determination processing is processing in which it is first confirmed as to whether the tracking target subject already exists inside the predetermined region.

It should be noted that, in a case in which a plurality of predetermined regions have been set, the determination processing confirms whether the tracking target subject exists inside any of the predetermined regions. In the case of "Yes" in step S006, that is, in a case in which the tracking target subject exists inside a predetermined region, the processing proceeds to step S007. In the case of "No" in step S006, that is, in a case in which the tracking target subject does not exist inside a predetermined region, the processing proceeds to step S008 of FIG. 18 via A of FIG. 17.

In step S007, the region inside/outside determination unit C1008 determines whether the center of the face frame (or face) of the tracking target subject exists on the outer side of the exit determination region. That is, in step S007, the region inside/outside determination unit A1010 determines whether the tracking target subject that is inside the predetermined region in step S006 has exited from the exit determination region within the predetermined region.

In the case of "Yes" in step S007, that is, in a case in which the tracking target subject has exited from the exit determination region within the predetermined region, the processing proceeds to step S008 of FIG. 18 via A of FIG. 17. In the case of "No" in step S007, that is, in a case in which the tracking target subject has not exited the exit determination region and continues to remain within the predetermined region, this information is output to the angle of view operation calculation unit A1011, and the processing proceeds to step S012 of FIG. 18 via C of FIG. 17.

In step S008 of FIG. 18, the region inside/outside determination unit C1008 determines whether the center of the face frame (or face) of the tracking target subject exists on the inner side of an entry determination region of any region, and outputs the determination result to the angle of view operation calculation unit A1011. That is, in step S008, it is determined whether the tracking target subject that was not inside the predetermined region in step S006 has entered an entry determination region within the predetermined region.

In the case of "Yes" in step S008, that is, in a case in which the tracking target subject has entered an entry determination region within the predetermined region, the processing proceeds to step S009. In the case of "No" in step S008, that is, in a case in which the tracking target subject has not entered an entry determination region within the predetermined region, the processing proceeds to step S010.

In step S009, the angle of view operation calculation unit A1011 calculates the angle of view control value for changing the angle of view to the predetermined region into which the tracking target has entered, outputs this angle of view control value to the angle of view operation unit A1012, and generates a PTZ control command. Then, the processing proceeds to step S011.

In contrast, in step S010, the angle of view operation calculation unit A1011 calculates the angle of view control value for displaying the tracking target within the screen in accordance with the predicted position of the tracking target subject and the composition setting acquired from the tracking setting unit A1007, outputs this angle of view control value to the angle of view operation unit A1012, and generates a PTZ control command. Then, the processing proceeds to step S011.

In step S011, the angle of view operation unit A1012 outputs a PTZ control command to the PTZ driving apparatus A1003 based on the angle of view control value that has been input from the angle of view operation calculation unit A1011. In addition, the PTZ driving apparatus A1003 changes the image capturing angle of view by PTZ driving. Then, the processing proceeds to step S012.

In step S012, the video output unit A1013 outputs the video information that has been input to the external apparatus A1014. Then, the processing proceeds to step S013.

In step S013, it is determined whether a stop operation to turn off the image capturing device has been performed by a user operation. In the case of "No" in step S013, the processing returns to step S001 of FIG. 17 via D of FIG. 18, and, in the case of "Yes" in step S013, the automatic image capturing processing is ended, and the flows of FIGS. 17 and 18 are ended.

Thus, in the Third Embodiment, in a case in which a tracking target subject moves through a region in which a plurality of predetermined regions overlap, the angle of view control can be switched seamlessly by determining that the subject has entered another overlapping predetermined region immediately after exiting from one predetermined region.

Fourth Embodiment

Next, an automatic image capturing system D1000 according to a Fourth Embodiment of the present invention will be explained with reference to FIG. 19.

Figure 19:
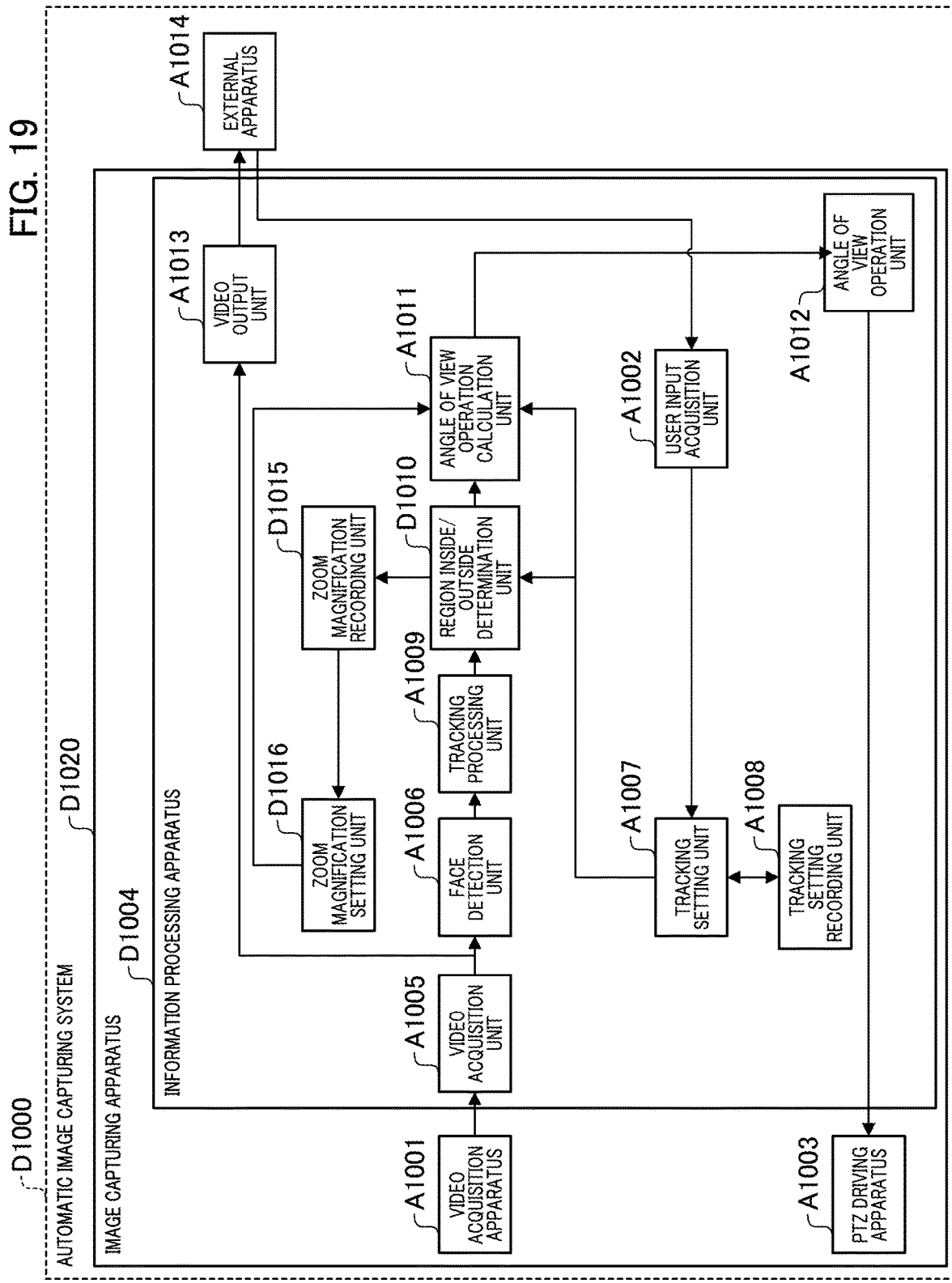
FIG. 19 is a functional block diagram of an automatic image capturing system according to a Fourth Embodiment of the present invention.

FIG. 19 is a functional block diagram of the automatic image capturing system according to the Fourth Embodiment of the present invention. In the Fourth Embodiment, processing is performed to control the zoom magnification such that the zoom magnification remains substantially unchanged both before the tracking target subject enters a predetermined region and after the tracking target subject exits the predetermined region.

The automatic image capturing system D1000 according to the present embodiment includes an image capturing apparatus D1020 that comprises a video acquisition apparatus A1001, a PTZ driving apparatus A1003, and an information processing apparatus D1004, and also includes an external apparatus A1014.

The image capturing apparatus D1020 and the external apparatus A1014 are connected via a network. In addition, the image capturing apparatus and the external apparatus A1014 may be connected via a video interface.

The image capturing apparatus of the present embodiment performs tracking processing based on a video acquired from the video acquisition apparatus A1001 and a tracking setting acquired from a user input acquisition unit A1002. Then, the image capturing apparatus performs angle of view control by using the PTZ driving apparatus A1003 so that the tracking target does not deviate from the angle of view.

Then, when performing angle of view control, a determination is performed as to whether or not the tracking target is inside a predetermined region that has been set, and the angle of view control is switched between when the tracking target is inside the predetermined region and when it is outside the predetermined region. Then, the image capture result is displayed on the external apparatus A1014.

The information processing apparatus D1004 performs image analysis processing, determination processing, and the like. The information processing apparatus D1004 performs tracking processing based on the coordinates of the face detected by using the video that has been input, and the composition setting that has been input by the user.

Furthermore, in a case in which the tracking target subject is inside a region that has been input by the user (a predetermined region), the angle of view is changed to that region and the angle of view is then fixed, and the angle of view control is switched according to the position of the tracking target subject so that the angle of view control based on the composition setting is performed when the tracking target subject exits the predetermined region.

The information processing apparatus D1004 includes a video acquisition unit A1005, a face detection unit A1006, a tracking setting unit A1007, a tracking setting recording unit A1008, a tracking processing unit A1009, a region inside/outside determination unit D1010, a zoom magnification recording unit D1015, and a zoom magnification setting unit D1016. Furthermore, the information processing apparatus C1004 includes an angle of view operation calculation unit D1011, an angle of view operation unit A1012, and a video output unit A1013.

The region inside/outside determination unit D1010 performs a determination as to whether the tracking target subject is inside or outside the predetermined region, based on tracking processing results that have been input from the tracking processing unit A1009, and region settings and composition settings that have been input from the tracking setting unit. In addition, among the composition settings, it is possible to turn off the adjustment of the size at which the tracking target subject is displayed within the screen.

This is used when it is desired to maintain the zoom magnification set at the start of image capturing. That is, if the tracking target subject enters a predetermined region and is then controlled with a fixed angle of view to maintain the angle of view, and, subsequently, exits the predetermined region and is controlled based on the composition setting, the zoom magnification changes before the predetermined region entry and after the predetermined region exit.

In the Present Embodiment, in order to control the zoom magnification such that it does not change before the predetermined region entry and after the predetermined region exit, the zoom magnification of the image capturing angle of view is recorded when the tracking target subject enters the predetermined region.

For example, as shown in FIG. 5, when the tracking target subject moves from P303 to P304 and enters the predetermined region, the zoom magnification of D301, which is the image capturing angle of view before the entry into the predetermined region, is recorded in the zoom magnification recording unit D1015. Other region determination operations are similar to those of the region inside/outside determination unit B1010, and an explanation thereof is, therefore, omitted.

The zoom magnification recording unit D1015, serving as a zoom magnification setting unit, records the zoom magnification that has been input from the region inside/outside determination unit D1010, and outputs the recorded zoom magnification to the zoom magnification setting unit D1016. The zoom magnification setting unit D1016 sets the zoom magnification of the video acquisition apparatus A1001 to substantially the same zoom magnification as before the target object enters the predetermined region. The zoom magnification setting unit D1016 outputs the set zoom magnification to the angle of view operation calculation unit D1011.

The angle of view operation calculation unit D1011 calculates the angle of view value to be controlled based on the determination result and region information that has been input from the region inside/outside determination unit D1010, the composition setting that has been input from the tracking setting unit A1007, and the zoom magnification that has been input from the zoom magnification setting unit D1016.

Assume a case in which, within the composition settings, the automatic adjustment of the size at which the tracking target subject is displayed within the screen is set to "off", when it has been determined that the tracking target subject has exited from the inside of the predetermined region to the outside of the predetermined region. In that case, the angle of view control value is calculated based on the zoom magnification read from the zoom magnification recording unit D1015 and the position setting for displaying the human body within the screen, which has been input from the tracking setting unit A1007.

In contrast, in a case in which the automatic adjustment of size is not turned off, the angle of view control value is calculated based on the composition setting that has been input from the tracking setting unit A1007. Because the calculation of other angle of view control values is similar to that of the angle of view operation calculation unit A1011, an explanation thereof is omitted. Furthermore, because the functions of the other blocks are similar to those of the First Embodiment, an explanation thereof is omitted.

Figure 20:
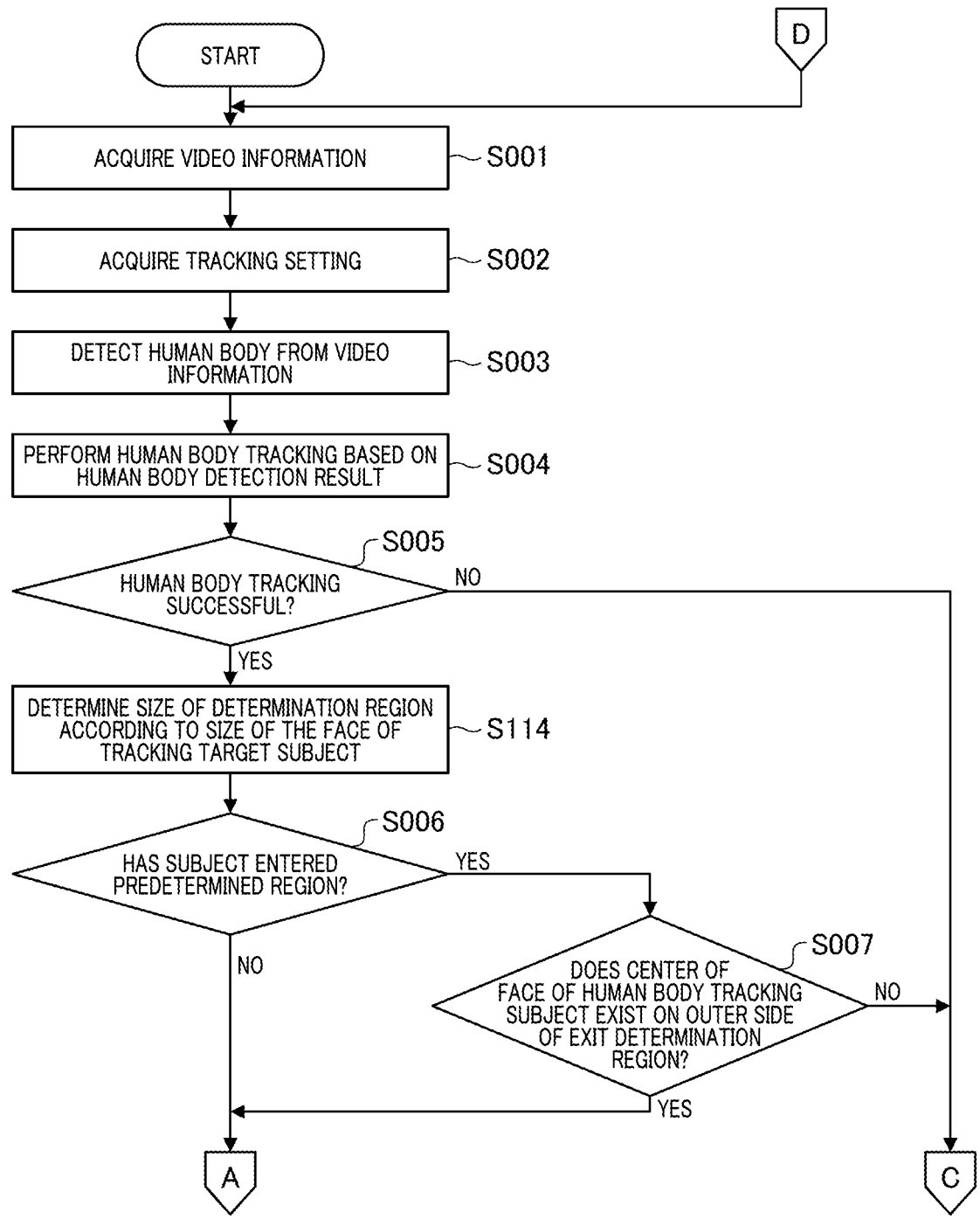
FIG. 20 is a flowchart showing the processing steps of the image capturing apparatus according to the Fourth Embodiment of the present invention.
Figure 21:
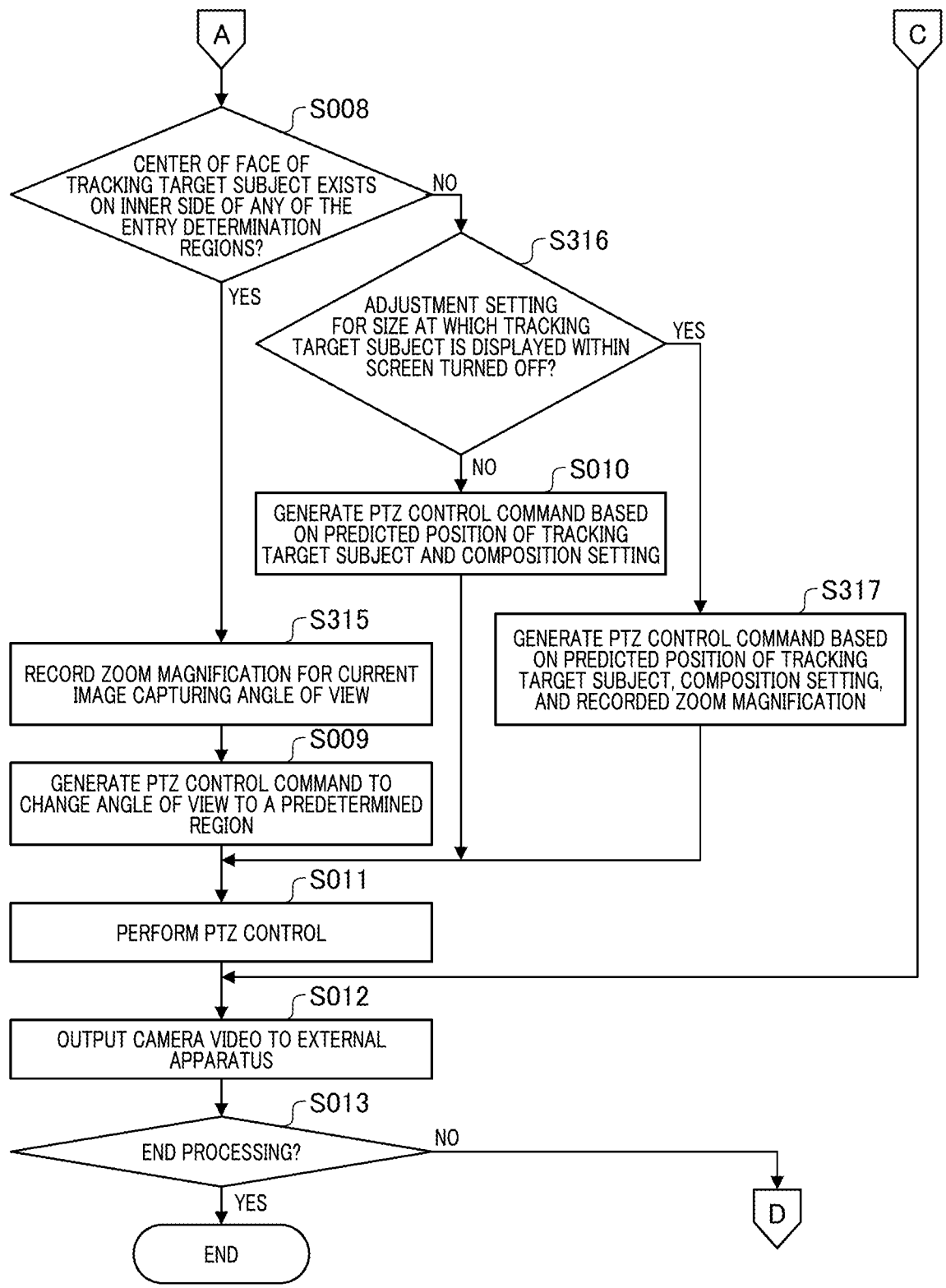
FIG. 21 is a flowchart showing the continuation of the processing steps of FIG. 20.

FIG. 20 is a flowchart showing the processing steps of the image capturing apparatus according to the Fourth Embodiment of the present invention, and FIG. 21 is a flowchart showing the continuation of the processing steps of FIG. 20. It should be noted that the operations of each step of the flowcharts of FIG. 20 and FIG. 21 are performed by a CPU, or the like, serving as a computer within the image capturing apparatus executing a computer program that has been stored in a memory.

When the image capturing apparatus D1020 of the automatic image capturing system D1000 is activated by a user operation, the flow shown in FIG. 20 and FIG. 21 is started. First, in step S001, the video acquisition unit A1005 acquires video information from the video acquisition apparatus A1001, and outputs the video information to the face detection unit A1006 and the video output unit A1013. Then, the processing proceeds to step S002.

In step S002, the user input acquisition unit A1002 acquires the region information and composition setting (setting related to the position at which the target subject is displayed within the screen and the size at which it is displayed within the screen, and the like), as well as the automatic selection setting of the tracking target subject that has been set by the user, and outputs the acquired region information, composition setting, and automatic selection setting for the tracking target subject to the tracking setting unit A1007. The tracking setting unit A1007 outputs and records the region information, composition setting, and automatic selection setting of the tracking target that have been input to the tracking setting recording unit A1008. Then, the processing proceeds to step S003.

In step S003, the face detection unit A1006 performs face detection as human body detection by image recognition based on the video information that has been input. The detected face information and video information are output to the tracking processing unit A1009. Then, the processing proceeds to step S004.

In step S004, the tracking setting unit A1007 selects the tracking target from the face information that has been input and performs tracking processing. In addition, the tracking setting unit A1007 outputs the coordinate information of the tracking target subject to a region inside/outside determination unit D1008 as a result of the tracking processing. Then, the processing proceeds to step S005.

In step S005, the tracking setting unit A1007 determines whether the tracking processing of the human body (face) was successful. In the case of "Yes" in step S005, the processing proceeds to step S114. In the case of "No" in step S005, the processing proceeds to step S012 of FIG. 21 via C of FIG. 20.

In step S114, the region inside/outside determination unit D1008 dynamically determines the size of the entry determination region and the exit determination region of the setting region according to the size of the face of the tracking target subject. This processing is similar to that of the Second Embodiment. Note that, in the Present Embodiment, this step may be omitted. Then, the processing proceeds to step S006.

In step S006, the region inside/outside determination unit D1008 determines whether the tracking target subject is inside the predetermined region. This determination processing is processing in which the tracking target subject is first confirmed to already exist inside the predetermined region. It should be noted that, in a case in which a plurality of predetermined regions have been set, the determination processing confirms whether the tracking target subject exists inside any of the predetermined regions.

In the case of "Yes" in step S006, that is, in a case in which the tracking target subject exists inside a predetermined region, the processing proceeds to step S007. In the case of "No" in step S006, that is, in a case in which the tracking target subject does not exist inside a predetermined region, the processing proceeds to step S008 of FIG. 21 via A of FIG. 20.

In step S007, the region inside/outside determination unit D1008 determines whether the center of the face frame (or face) of the tracking target subject exists on the outer side of the exit determination region. That is, in step S007, the region inside/outside determination unit D1008 determines whether the tracking target subject that is inside the predetermined region in step S006 has exited from the exit determination region within the predetermined region.

In the case of "Yes" in step S007, that is, in a case in which the tracking target subject has exited from the exit determination region within the predetermined region, the processing proceeds to step S008 of FIG. 21 via A of FIG. 20. In the case of "No" in step S007, that is, in a case in which the tracking target subject has not exited the exit determination region and continues to remain within the predetermined region, this information is output to the angle of view operation calculation unit D1011, and the processing proceeds to step S012 of FIG. 21 via C of FIG. 20.

In step S008 of FIG. 21, the region inside/outside determination unit D1008 determines whether the center of the face frame (or face) of the tracking target subject exists on the inner side of the entry determination region of the predetermined region, and outputs the determination result to the angle of view operation calculation unit D1011.

That is, in step S008, it is determined whether the tracking target subject that was not inside the predetermined region in step S006 has entered the entry determination region within the predetermined region. Alternatively, in step S007, it is determined whether the tracking target subject, which has exited from the exit determination region, has again entered the entry determination region inside the predetermined region.

In the case of "Yes" in step S008, that is, in a case in which the tracking target subject has entered an entry determination region within the predetermined region, the processing proceeds to step S315. In the case of "No" in step S008, that is, in a case in which the tracking target subject has not entered the entry determination region within the predetermined region, the processing proceeds to step S316.

In step S315, the region inside/outside determination unit D1008 outputs the current zoom magnification to the zoom magnification recording unit D1015 for recording. That is, the size of the image capturing range before changing the size of the image capturing range is stored. Then, the processing proceeds to step S009.

In contrast, in step S316, the angle of view operation calculation unit D1011 determines whether the adjustment setting for the size at which the tracking target subject is displayed within the screen is turned off in the composition setting. In the case of "No" in step S316, the processing proceeds to step S010. In the case of "Yes" in step S316, the processing proceeds to step S317.

In step S317, the angle of view operation calculation unit D1011 sets the angle of view (control value) based on the predicted position of the tracking target subject, the position setting for displaying the tracking target subject within the screen acquired from the tracking setting unit A1007, and the zoom magnification acquired from the zoom magnification recording unit D1015.

That is, when the tracking target subject exits to the outside of the predetermined region, control is applied so as to make the size of the image capturing range (zoom magnification) the size that has been recorded in step S315 at the time of the predetermined entry. Then, the angle of view operation control value that has been calculated is output to the angle of view operation unit A1012, and a PTZ control command is generated. Then, the processing proceeds to step S011.

Figure 22:
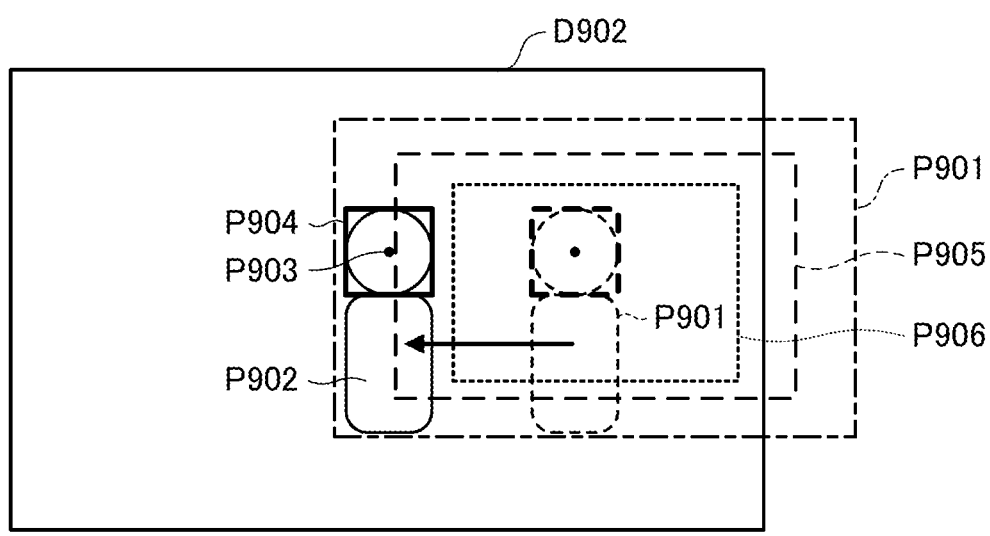
FIG. 22 is a diagram explaining an angle of view control in accordance with a zoom magnification and composition setting recorded at the time of entry into a region when it has been determined that the tracking target subject has exited from the predetermined region according to the Fourth Embodiment of the present invention.

It should be noted that FIG. 22 is a diagram explaining the angle of view control in accordance with the zoom magnification and composition setting recorded at the time of entry into the predetermined region when it has been determined that the tracking target subject has exited from the predetermined region according to the Fourth Embodiment of the present invention. In the example shown in FIG. 22, in a case in which the position P901 of the tracking target subject exists within the entry determination region P906, the angle of view is controlled such that it becomes the angle of view corresponding to the predetermined region (region that has been set).

However, in a case in which the tracking target subject moves to position P902, and the center P903 of the face frame P904 has exited to the outside of the exit determination region 905, the angle of view is controlled so as to become D902 based on the zoom magnification and composition setting that were stored in the zoom magnification recording unit D1015 at the time of entry into the predetermined region.

In contrast, in step S009, the angle of view operation calculation unit D1011 calculates the angle of view control value for changing the angle of view to the predetermined region into which the tracking target has entered, outputs this angle of view control value to the angle of view operation unit D1012, and generates a PTZ control command. Then, the processing proceeds to step S011.

In addition, in step S010, the angle of view operation calculation unit D1011 calculates the angle of view control value for displaying the tracking target within the screen in accordance with the composition setting acquired from the tracking setting unit A1007, outputs this angle of view control value to the angle of view operation unit A1012, and generates a PTZ control command. Then, the processing proceeds to step S011.

In step S011, the angle of view operation unit A1012 outputs a PTZ control command to the PTZ driving apparatus A1003 based on the angle of view control value that has been input from the angle of view operation calculation unit D1011. In addition, the PTZ driving apparatus A1003 changes the image capturing angle of view by PTZ driving. Then, the processing proceeds to step S012. In step S012, the video output unit A1013 outputs the video information that has been input to the external apparatus A1014. Then, the processing proceeds to step S013.

In step S013, it is determined whether a stop operation to turn off the image capturing device has been performed by a user operation. In the case of "No" in step S013, the processing returns to step S001 of FIG. 20 via D of FIG. 21, and, in the case of "Yes" in step S013, the automatic image capturing processing is ended, and the flows of FIG. 20 and FIG. 21 are ended.

Here, the zoom magnification recorded (stored) in step S315 is read out in step S317 and used to control the image capturing range (zoom ratio) in step S011 the next time.

That is, when the tracking target subject enters the inside of the predetermined region, the image capturing range of the image capturing unit is changed and the size of the image capturing range before the angle of view change is stored, and when the tracking target subject exits to the outside of the predetermined region, the image capturing range is controlled so as to be the size of the image capturing range that has been stored.

In this manner, in the Fourth Embodiment, in a case in which the size setting for displaying the tracking target subject within the screen as a composition setting is set to "off", the zoom magnification at the time the tracking target subject enters the predetermined region is recorded.

Then, when it is determined that the tracking target subject has exited from the inside of the predetermined region, angle of view control is performed according to the recorded zoom magnification and the position setting for displaying the tracking target subject within the screen as a composition setting. Thereby, it is possible to control the angle of view such that the zoom magnification remains substantially unchanged before the predetermined region entry and after the predetermined region exit.

That is, in the Fourth Embodiment, the image capturing range of the image capturing unit is changed upon entry into the inside of the predetermined region, and the size (zoom magnification) of the image capturing range before the change (before the entry) is stored.

Then, in a case in which it is determined that the tracking target subject has exited from the inside of the above-described predetermined region, the zoom magnification of the image capturing unit is set to the same zoom magnification as the size (zoom magnification) of the image capturing range that has been stored. Therefore, it is possible to perform tracking at a size of the image capturing range that does not cause discomfort even in a case in which entry into and exit from a predetermined region occurs frequently.

It should be noted that step S006 to step S008, and step S316, and the like, function as a determination step that performs an assessment as to whether or not a target object has exited from the inside of the predetermined region. Furthermore, in this determination step, an exit determination is performed based on whether or not the target object has exited from an exit determination region that is smaller than the predetermined region.

In addition, step S317 functions as a zoom magnification setting step that sets the zoom magnification of the image capturing unit to the same zoom magnification as that before the target object enters the predetermined region in a case in which it has been determined that the target object has exited from the inside of the predetermined region. It should be noted that in the above, "the same zoom magnification" is not limited to exactly the same zoom magnification, but also includes substantially the same zoom magnification.

It should be noted that, in the Fourth Embodiment, entry into the inside of the predetermined region is determined by using an entry determination region, and exit to the outside of the predetermined region is determined by using an exit determination region that is larger than the entry determination region. However, the Fourth Embodiment can be applied even when the entry determination region and the exit determination region are of the same size, and is not limited by size of the entry determination region and the size of the exit determination region.

It should be noted that, in the configuration of the Fourth Embodiment, when it is determined that the tracking target subject has exited from the predetermined region and the angle of view control is performed according to the composition setting and zoom magnification, PTZ control may be performed in accordance with the composition setting while returning to the recorded zoom magnification.

In addition, in the configurations of the First to Fourth Embodiments, when sight of the tracking target subject is lost in a state in which the tracking target subject is inside a predetermined region, a configuration in which the angle of view moves to a setting specified in advance so as to search for the tracking target subject is possible.

In addition, in the configurations of the First to Fourth Embodiments, when the tracking target subject is in a state of being inside a predetermined region and the size of the tracking target subject is about to fall below a minimum detectable size, a configuration in which the fixed angle of view is released, and zooming in is performed so as to avoid losing sight of the tracking target subject is possible.

Fifth Embodiment

Figure 23:
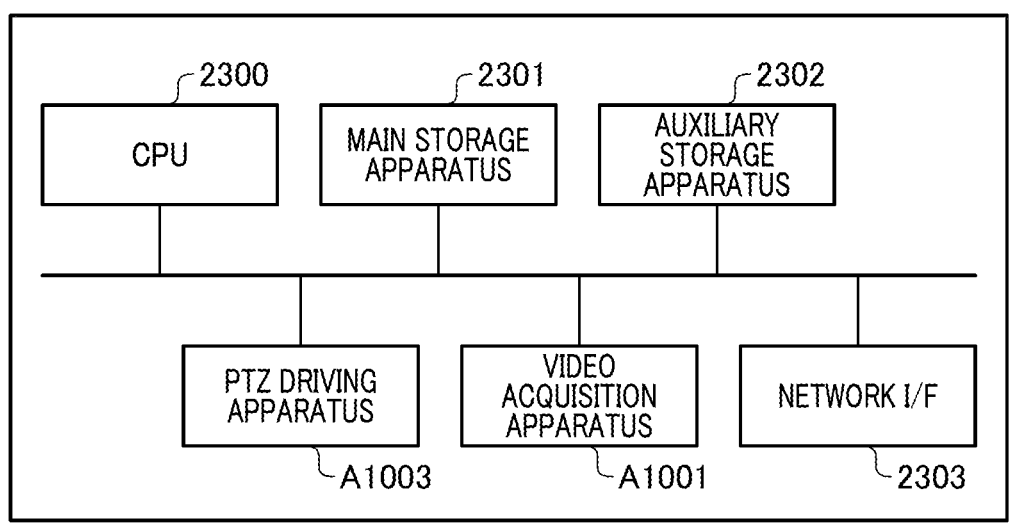
FIG. 23 is a diagram explaining a hardware configuration of an image capturing apparatus.

Next, with reference to FIG. 23, a hardware configuration of an image capturing apparatus will be explained. An example hardware configuration of the image capturing apparatus will be explained by using the block diagram of FIG. 23. As shown in FIG. 23, the image capturing apparatus can be configured to include a CPU 2300, a main storage apparatus 2301, an auxiliary storage apparatus 2302, a PTZ driving apparatus A1003, and a video acquisition apparatus A1001. It should be noted that the configuration shown in FIG. 23 is merely an example of a configuration that can be applied to the image capturing apparatus, and can be modified/changed as needed.

The CPU 2300, as an information processing device A1004, executes processing by using computer programs and data stored in the main storage apparatus 2301. Thus, the CPU 2300 performs control of the operation of the entire image capturing apparatus, and executes or controls each of the above-described processing performed by the image capturing apparatus.

For example, the CPU 2300 implements the functions of each functional unit of the information processing apparatus A1004 shown in FIG. 1, FIG. 10, FIG. 15, and FIG. 19, by executing processing using computer programs and data stored in the main storage apparatus 2301.

The main storage apparatus 212 is a storage device such as a RAM (Random Access Memory). The main storage apparatus 2301 stores computer programs and data that have been loaded from the auxiliary storage apparatus 2302. In addition, the main storage apparatus 2301 also includes an area for storing captured images that have been acquired by the video acquisition apparatus A1001 and various types of data that has been received from the external apparatus A1014 through the network I/F 2303.

The main storage apparatus 2301 also includes a work area to be used when the CPU 2300 executes various types of processes. Thereby, the main storage apparatus 2301 can provide various types of areas as needed.

The auxiliary storage apparatus 2302 is a large-capacity information storage device such as an HDD (Hard Disk Drive), a ROM (Read Only Memory), or an SSD (Solid State Drive).

The auxiliary storage apparatus 2302 stores an OS (operating system) and computer programs and data to cause the CPU 2300 to execute or to control each of the processes described above as processes performed by the image capturing apparatus. The auxiliary storage apparatus 2302 also stores data (for example, the above-described image capturing parameters) received from the external apparatus A1014 through the network I/F 2303.

Computer programs and data stored in the auxiliary storage apparatus 2302 are loaded as needed into the main storage apparatus 2301 in accordance with the control by the CPU 2300, and become subject to processing by the CPU 2300.

As described above, the PTZ driving apparatus A1003 includes a function of changing the angle of view of the image capturing apparatus, and is configured by a driving apparatus such as a motor to perform at least one of a pan/tilt/zoom control.

The video acquisition apparatus A1001 is a portion that generates captured video by capturing an image of the surroundings, as described above, and is configured by a camera, or the like. The network I/F 2303 is an interface that is used by the image capturing apparatus for performing data communication with the external apparatus A1014 through a network.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part of or the whole of the control according to the embodiments, a computer program realizing the function of the embodiments described above may be supplied to the information processing apparatus through a network or various storage media. Then, a computer (or a CPU, an MPU, or the like) of the information processing apparatus may be configured to read and to execute the program. In such a case, the program and the storage medium storing the program configure the present invention.

Furthermore, the present invention includes implementations that use at least one processor or circuit configured to perform the functions of the embodiments explained above. It should be noted that distributed processing may be performed by using a plurality of processors.

What is claimed is:

1. An information processing apparatus comprising:
at least one processor or circuit configured to function as:
   a detection unit configured to detect a predetermined target object from an image that has been captured by an image capturing unit;
   a setting unit configured to set a predetermined region with respect to the image;
   a determination unit configured to perform a determination as to whether or not the target object has exited from the inside of the predetermined region;
   a control unit configured to control an image capturing range of the image capturing unit according to a result that has been determined by the determination unit; and
   a zoom magnification setting unit configured to set the zoom magnification of the image capturing unit to the same zoom magnification as that before the target object enters the predetermined region, in a case in which the determination unit determines that the target object has exited from the inside of the predetermined region,
   wherein the determination unit is further configured to perform an exit determination based on whether or not the target object has exited from an exit determination region that is smaller than the predetermined region, and to perform an entry determination based on whether or not the target object has entered into an entry determination region that is smaller than the exit determination region.

2. The information processing apparatus according to claim 1, wherein the determination unit is further configured to perform a determination as to whether or not the target object exists inside the predetermined region, and
   wherein the control unit is further configured to control the image capturing range so that the predetermined region is included in the image capturing range, in a case in which the determination unit determines that the target object exists inside the predetermined region.

3. The information processing apparatus according to claim 2, wherein the control unit is configured to control the image capturing range so that the position and size of the image capturing range correspond to the predetermined region, in a case in which the determination unit determines that the target object exists inside the predetermined region.

4. The information processing apparatus according to claim 1, wherein the setting unit can set a display position and a display size of the target object in the image, and
wherein, in a case in which the determination unit determines that the target object does not exist inside the predetermined region, the control unit is configured to control the image capturing range so that the target object is displayed at the display position and display size set by the setting unit.

5. The information processing apparatus according to claim 1, wherein the determination unit is configured to determine an entry in a case in which the center of the face of the target object exists on the inner side of the entry determination region.

6. The information processing apparatus according to claim 1, wherein the determination unit is further configured to determine an exit in a case in which the center of the face of the target object exists on the outer side of the exit determination region.

7. The information processing apparatus according to claim 1, wherein the determination unit is further configured to change the size of at least one of the entry determination region and the exit determination region, based on the size of the target object within the image capturing range.

8. The information processing apparatus according to claim 1, wherein the determination unit is further configured, in a case in which a plurality of predetermined regions are set, to determine whether the target object has not entered another predetermined region after determining that the target object has exited a predetermined region.

9. A method for processing information, the method comprising:
a detection step for detecting a predetermined target object from an image that has been captured by an image capturing unit;
a setting step for setting a predetermined region with respect to the image;
a determination step for performing a determination as to whether or not the target object has exited from the inside of the predetermined region;
a control step for controlling the image capturing range of the image capturing unit according to a result that has been determined by the determination step; and
a zoom magnification setting step for setting the zoom magnification of the image capturing unit to the same zoom magnification as that before the target object enters the predetermined region, in a case in which the determination step determines that the target object has exited from the inside of the predetermined region,
wherein the determination step further performs an exit determination based on whether or not the target object has exited from an exit determination region that is smaller than the predetermined region, and performs an entry determination based on whether or not the target object has entered into an entry determination region that is smaller than the exit determination region.

10. A non-transitory computer-readable storage medium configured to store a computer program comprising instructions for executing the following processes:
a detection step for detecting a predetermined target object from an image that has been captured by an image capturing unit;
a setting step for setting a predetermined region with respect to the image;
a determination step for performing a determination as to whether or not the target object has exited from the inside of the predetermined region;
a control step for controlling the image capturing range of the image capturing unit according to a result that has been determined by the determination step; and
a zoom magnification setting step for setting the zoom magnification of the image capturing unit to the same zoom magnification as that before the target object enters the predetermined region, in a case in which the determination step determines that the target object has exited from the inside of the predetermined region,
wherein the determination step further performs an exit determination based on whether or not the target object has exited from an exit determination region that is smaller than the predetermined region, and performs an entry determination based on whether or not the target object has entered into an entry determination region that is smaller than the exit determination region.

* * * * *